US010704291B2

(12) United States Patent
McInerney

(10) Patent No.: US 10,704,291 B2
(45) Date of Patent: Jul. 7, 2020

(54) QUICK ASSEMBLY HUNTING BLIND APPARATUS, AND A METHOD THEREOF

(71) Applicant: Michael John McInerney, Fairview, TX (US)

(72) Inventor: Michael John McInerney, Fairview, TX (US)

(*) Notice: Subject to any disclaimer, the term of this patent is extended or adjusted under 35 U.S.C. 154(b) by 102 days.

(21) Appl. No.: 16/006,836

(22) Filed: Jun. 12, 2018

(65) Prior Publication Data

US 2018/0290069 A1 Oct. 11, 2018

Related U.S. Application Data

(60) Continuation-in-part of application No. 15/178,487, filed on Jun. 9, 2016, now abandoned, which is a (Continued)

(51) Int. Cl.
 *E04H 15/44* (2006.01)
 *E04H 15/00* (2006.01)
 (Continued)

(52) U.S. Cl.
 CPC ........... *E04H 15/44* (2013.01); *A01M 31/025* (2013.01); *A63H 33/008* (2013.01);
 (Continued)

(58) Field of Classification Search
 CPC ... E04H 15/001; E04H 15/003; E04H 15/008; E04H 15/44; E04H 1/1244; E04H 1/1205;
 (Continued)

(56) References Cited

U.S. PATENT DOCUMENTS 918,138 A 4/1909 Flora
1,249,098 A 12/1917 Huye
(Continued)

FOREIGN PATENT DOCUMENTS

DE 19947512 A1 * 8/2002 ............... A01K 1/00
FR 1326537 A * 5/1963 ........... E04H 15/003
FR 2690897 A1 11/1993

*Primary Examiner* — Robert Canfield
(74) *Attorney, Agent, or Firm* — Aziz M. Ahsan; Ahsan & Associates, P.L.L.C.

(57) ABSTRACT

Portable, collapsible, lightweight housing structure for outdoors, and a method of assembling, and using the same. The invention encompasses an apparatus for providing shelter for humans and animals, which is portable, collapsible, and easily transportable from location to location, and can be quickly assembled, and disassembled. The apparatus comprises of a tubular frame, where a flat housing panel is wrapped around the tubular frame, and a cover is secured to the top of the assembly to from the portable, collapsible, lightweight housing structure or the quick assembly hunting blind or hunting blind kit. The portable, collapsible apparatus, has a ceiling or roof, and wall or panels that are made of one or more layers of material, such as, corrugated material, plastic material, composite material, waterproof material, weatherproof material, rigid honeycomb board material, polyethylene material, polypropylene material. The inventive apparatus could also have an attachable or detachable base or floor.

20 Claims, 23 Drawing Sheets

Related U.S. Application Data division of application No. 14/930,441, filed on Nov. 2, 2015, now Pat. No. 9,416,527, which is a continuation-in-part of application No. 14/286,947, filed on May 23, 2014, now abandoned.

(60) Provisional application No. 61/857,695, filed on Jul. 23, 2013, provisional application No. 61/826,581, filed on May 23, 2013.

(51) Int. Cl.
  *E04B 1/343* (2006.01)
  *E04H 1/02* (2006.01)
  *E04H 1/12* (2006.01)
  *A63H 33/00* (2006.01)
  *A01M 31/02* (2006.01)

(52) U.S. Cl.
  CPC ...... *E04B 1/34321* (2013.01); *E04B 1/34357* (2013.01); *E04B 1/34384* (2013.01); *E04H 1/02* (2013.01); *E04H 1/1205* (2013.01); *E04H 15/001* (2013.01); *E04H 15/008* (2013.01)

(58) Field of Classification Search
  CPC ............. E04H 1/1266; A01M 31/025; E04B 1/34384; Y10S 135/901; A63H 33/008
  USPC ....... 135/115, 116, 121, 157, 900, 901, 909; 52/71, 79.5; 43/1; 446/478
  See application file for complete search history.

(56) References Cited

U.S. PATENT DOCUMENTS

| | | | |
|---|---|---|---|
| 1,288,518 A * | 12/1918 | Collier | E04H 15/44 135/157 |
| 1,408,284 A * | 2/1922 | Galloway | A47B 43/04 312/6 |
| 1,803,626 A * | 5/1931 | Lasley | E04H 1/1244 135/128 |
| 1,918,375 A | 7/1933 | Bowersock | |
| 2,168,913 A * | 8/1939 | Middleton | E04H 15/00 135/157 |
| 2,282,362 A | 5/1942 | Johnson | |
| 2,577,248 A * | 12/1951 | James | B65D 5/685 229/122.29 |
| 2,801,145 A | 7/1957 | Jones | |
| 2,837,777 A * | 6/1958 | White | E04H 1/12 52/27 |
| 2,840,400 A * | 6/1958 | D'Azzo | E04F 10/02 403/188 |
| 2,936,771 A * | 5/1960 | Marchfield | E04H 15/001 135/148 |
| 2,963,122 A | 12/1960 | Jagemann | |
| 3,169,543 A * | 2/1965 | McGerty | E04H 15/48 135/152 |
| 3,230,962 A * | 1/1966 | Hoiness | A01K 97/22 135/148 |
| 3,473,722 A | 10/1969 | Rohde | |
| 3,904,105 A | 9/1975 | Booth | |
| 4,035,964 A * | 7/1977 | Robinson | E04B 1/3445 52/66 |
| 4,067,346 A * | 1/1978 | Husted | E04H 15/001 135/153 |
| 4,077,418 A * | 3/1978 | Cohen | E04H 15/48 135/118 |
| 4,186,507 A * | 2/1980 | Stinnett | A01M 31/00 43/1 |
| 4,214,694 A | 7/1980 | Struble | |
| 4,364,193 A | 12/1982 | Visco | |
| 4,504,497 A | 3/1985 | Kurth | |
| 4,554,937 A | 11/1985 | Irwin | |
| 4,632,138 A | 12/1986 | Irwin | |
| 4,672,779 A | 6/1987 | Boyd | |
| 4,716,919 A * | 1/1988 | Griffin | E04H 15/001 135/133 |
| 4,717,070 A | 1/1988 | Taub | |
| 4,798,019 A * | 1/1989 | Sury | A01M 31/025 135/901 |
| 4,926,893 A | 5/1990 | Klopfenstein et al. | |
| 4,992,068 A | 2/1991 | Conrad | |
| 5,010,909 A * | 4/1991 | Cleveland | E04H 15/001 135/119 |
| 5,062,234 A | 11/1991 | Green | |
| 5,172,525 A * | 12/1992 | Cook | E04H 15/001 135/901 |
| 5,172,526 A | 12/1992 | Morgan | |
| 5,178,100 A * | 1/1993 | Monk | A01K 1/0125 119/168 |
| 5,184,436 A | 2/1993 | Sadler | |
| 5,210,984 A | 5/1993 | Eckel | |
| 5,323,921 A | 6/1994 | Olsson | |
| 5,377,711 A * | 1/1995 | Mueller | E04H 15/001 135/115 |
| 5,622,198 A | 4/1997 | Elsinger | |
| 5,628,338 A | 5/1997 | Stumbo | |
| 5,660,002 A * | 8/1997 | Lashinger | A01G 9/16 52/63 |
| 5,711,478 A | 1/1998 | Turecek | |
| 5,752,470 A | 5/1998 | Koneke | |
| 5,813,160 A | 9/1998 | Thoelke | |
| 6,021,794 A | 2/2000 | Guerra | |
| 6,098,335 A * | 8/2000 | Brown, Jr. | A01G 9/16 47/17 |
| 6,108,982 A | 8/2000 | Davison | |
| 6,553,725 B2 | 4/2003 | Washington | |
| 6,618,988 B2 * | 9/2003 | Williams | A01G 9/16 47/17 |
| 6,718,565 B1 | 4/2004 | Cruz | |
| 6,948,281 B1 | 9/2005 | Carmichael | |
| 7,076,922 B1 * | 7/2006 | Parres | E04B 1/8218 52/646 |
| 7,188,635 B2 | 3/2007 | Johnson | |
| 7,467,985 B2 * | 12/2008 | Manrique | A63H 33/008 434/403 |
| 7,578,307 B2 | 8/2009 | Ung et al. | |
| 7,743,781 B2 | 6/2010 | Slaughter | |
| 7,749,041 B2 * | 7/2010 | Leleu | A63J 19/00 446/147 |
| 7,886,757 B2 | 2/2011 | Hotes | |
| 8,191,564 B1 | 6/2012 | Lindholm | |
| 8,360,083 B2 | 1/2013 | Anders, III | |
| 8,453,664 B2 | 6/2013 | Parsons et al. | |
| 8,769,880 B2 | 7/2014 | Mouyiaris | |
| 8,881,470 B1 | 11/2014 | Lass | |
| D726,858 S * | 4/2015 | McInerney | D21/838 |
| 9,316,017 B1 * | 4/2016 | Slaughter | A01M 31/025 |
| 2001/0027992 A1 | 10/2001 | Strong | |
| 2002/0026742 A1 * | 3/2002 | Washington | A01M 31/025 43/1 |
| 2004/0200518 A1 | 10/2004 | Guy | |
| 2004/0262307 A1 | 12/2004 | DeCarlo | |
| 2005/0017000 A1 | 1/2005 | Vergiels | |
| 2005/0108955 A1 | 5/2005 | Howe et al. | |
| 2006/0283493 A1 * | 12/2006 | Charles | E04H 1/1266 135/121 |
| 2007/0006909 A1 | 1/2007 | Lewis | |
| 2007/0033854 A1 * | 2/2007 | Ridge | A01M 31/025 43/1 |
| 2009/0277094 A1 | 11/2009 | Ward | |
| 2009/0308422 A1 * | 12/2009 | Rizzotto | E04H 4/108 135/121 |
| 2011/0203629 A1 * | 8/2011 | Smith | E04H 15/001 135/121 |
| 2011/0209734 A1 | 9/2011 | Cannady | |

* cited by examiner

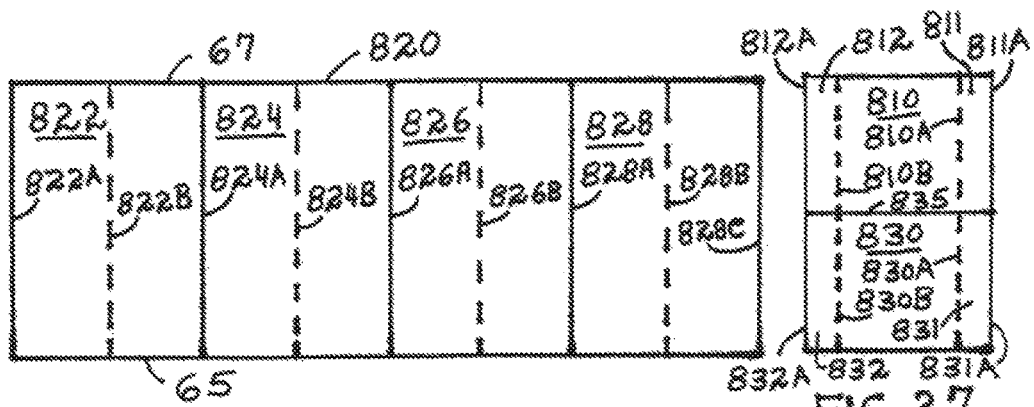
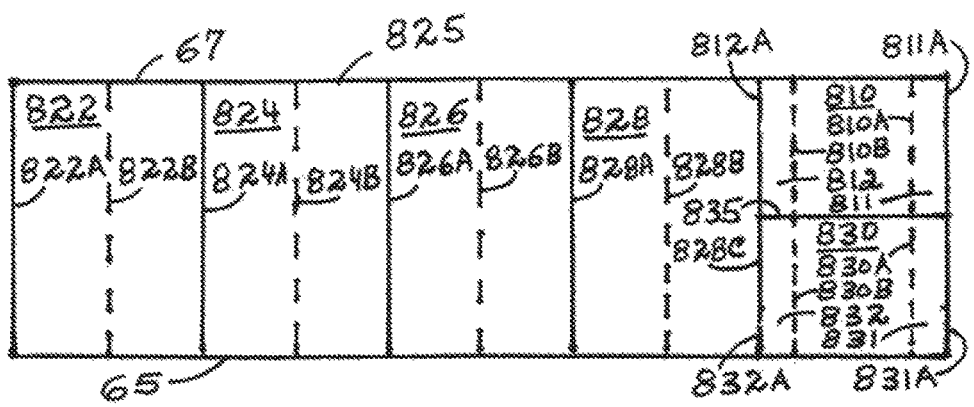
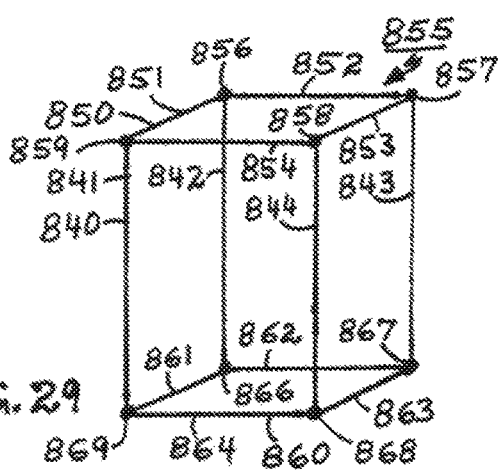
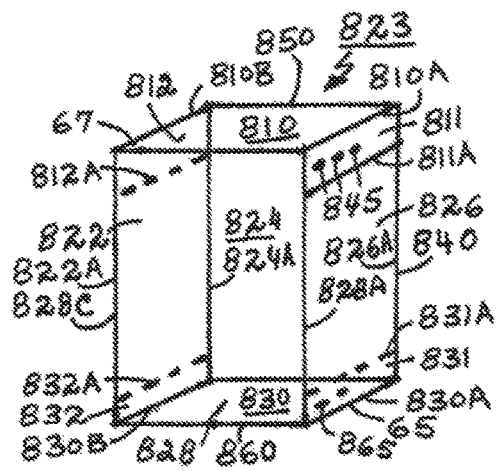

QUICK ASSEMBLY HUNTING BLIND APPARATUS, AND A METHOD THEREOF

CROSS-REFERENCE TO RELATED APPLICATIONS

The instant patent application is a Continuation-In-Part of U.S. patent application Ser. No. 15/178,487, filed on Jun. 9, 2016, titled "PORTABLE, COLLAPSIBLE, LIGHTWEIGHT HOUSING STRUCTURE FOR OUTDOORS, AND A METHOD OF ASSEMBLING, AND USING THE SAME," which was a Divisional patent application of U.S. patent application Ser. No. 14/930,441, filed on Nov. 2, 2015, titled "PORTABLE, COLLAPSIBLE, LIGHTWEIGHT HOUSING STRUCTURE FOR OUTDOORS, AND A METHOD OF ASSEMBLING AND USING THE SAME", and now U.S. Pat. No. 9,416,527, which was a Continuation-In-Part of U.S. patent application Ser. No. 14/286,947, filed on May 23, 2014, titled "AN IMPROVED, PORTABLE, COLLAPSIBLE, HUMAN SHELTER FOR OUTDOORS, AND A METHOD OF ASSEMBLING, AND USING THE SAME." and the instant patent application also claims priority to and the benefit of U.S. Provisional Patent Application Ser. No. 61/826,581, filed on May 23, 2013, titled "PORTABLE, COLLAPSIBLE, HUMAN SHELTER FOR OUTDOORS, AND A METHOD OF ASSEMBLING, AND USING THE SAME," and U.S. Provisional Patent Application Ser. No. 61/857,695, filed on Jul. 23, 2013, titled "AN IMPROVED, PORTABLE, COLLAPSIBLE, HUMAN SHELTER. FOR OUTDOORS, AND A METHOD OF ASSEMBLING, AND USING THE SAME," and the entire disclosures of pending patent application, and provisional patent applications is incorporated herein by reference.

FIELD OF THE INVENTION

Portable, collapsible, lightweight housing structure for outdoors, and a method of assembling, and using the same. The invention encompasses an apparatus for providing shelter for humans and animals, which is portable, collapsible, and easily transportable from location to location, and can be quickly assembled, and disassembled. The apparatus comprises of a tubular frame, and where a flat housing panel is wrapped around the tubular frame, and a cover is secured to the top of the assembly to from the portable, collapsible, lightweight housing structure or the quick assembly hunting blind or a hunting blind kit. The portable, collapsible apparatus, has a ceiling or roof, and wall or panels that are made of one or more layers of material, such as, corrugated material, plastic material, composite material, waterproof material, weatherproof material, rigid honeycomb board material, polyethylene material, polypropylene material. Optionally, the inventive apparatus could also have an attachable or detachable base or floor.

BACKGROUND INFORMATION

Portable, collapsible, human shelter for outdoors, such as, hunting blinds, and other similar type of portable buildings come in different shapes and sizes, and have been known and used for many years, and for a variety of reasons and purposes.

U.S. Pat. No. 4,186,507 (Arvil L. Stinnett), the entire disclosure of which is incorporated herein by reference, discloses a portable duck blind consisting of a lightweight frame collapsible and foldable to a compact size for easy transportation, a pliably foldable cover adapted to be supported on the frame to form a concealing enclosure for one or more hunters, the cover having concealed openings for allowing the hunters to view the flight of game birds and a top flap which is easily displaced to allow the hunters to stand for shooting, and a hollow stool on which a hunter may sit while occupying the blind, and into which the folded cover may be placed for storage.

U.S. Pat. No. 5,184,436 (Ted Sadler), the entire disclosure of which is incorporated herein by reference, discloses a portable structure that may be easily assembled and disassembled. The structure has particular value in supplying emergency shelter in a disaster. The structure is formed from two boards which are stored in a folded condition, and which may be expanded to define an enclosure. The two boards are interconnected by tabs, such that the structure is easily assembled and disassembled.

U.S. Pat. No. 6,553,725 (Scott Washington), the entire disclosure of which is incorporated herein by reference, discloses a blind for use by hunters, bird watchers, field observers and the like has at least three upstanding walls, a top cover and a bottom pan where at least one of the walls has an opening for ingress and egress and at least one of the walls has an openable and closeable window.

U.S. Pat. No. 7,743,781 (Jerry Micah Slaughter), the entire disclosure of which is incorporated herein by reference, discloses a portable reconfigurable hunting blind assembly comprising six rectangular frames joined together side edge to side edge along five hinge lines for accordion folding, and a camouflage covering mounted to each of the frames to define six panel-shaped wall units, the camouflage covering defining a window in at least some of the wall units.

U.S. Patent Publication No. 2004/0200518 (Kenneth Wayne Guy), the entire disclosure of which is incorporated herein by reference, discloses an item made from heavy duty lightly waxed corrugated cardboard. The cardboard is of the thickness approximately 10 millimeters thick. The cardboard is pressed in sectional pieces with perforations in the required areas to be of the spec's to meet the fitted finished product. The products are the cardboard houses which is corrugated notched and sectioned to fit in the notched areas to interlock when put together creating a temporary shelter or play house. On the "A" Frame house, one is 3 pieces, which part letter A is 5' times 7' or can also be approx. 6.5*_. Then part letter B is the rest of the sectional of which measures 5' at the base of door in 2 sections, the back is 5' at base tapering up to a point attached to the roof section as the doors are. On the house type version the floor section part "A" measures 4' ft. to 5 ft. times 6 ft, to 7 ft. Section letter "B" measures at this when calculated for the smaller version. 12 ft. times 4 ft, with sections perforated to create the door and 2 side windows and one rear window. This section is notched and clipped so to fit together forming he walls of the shelter/house. The other dimension is 4 ft. times 24 ft. The roof is section letter C and measures 6 ft. to 6 ft, at the squared roof part area, then the top ends measure 4 ft. to 5 ft. at the base cut to 45 degree to top creating the pitch then connecting to the other top of roof by means of male to female notches as well as the bottom of the ends to the front and rear of the top and then to the house side walls then completion is done creating a cardboard house/shelter. This idea has multiple use, examples are as follows: Could be kept in car or truck for emergency use of any kind. Could be used as a camping alternative or hiking emergency. Could be handed out at shelters for the homeless people. Could be used in disaster situations.

U.S. Patent Publication No. 2007/0033854 (Glenn Fielding Ridge), the entire disclosure of which is incorporated herein by reference, discloses a frameless portable hunting blind/ice fishing hut that absorbs sounds, and scent with carry/storage case. The hunting blind/ice fishing hut, is a enclosed room-like structure with or without a tree break-up pattern on the exterior and having at least two wall panels forming at least four walls with at least one horizontal lift-up and or sliding window in each wall that open and close, a door that opens outward, an interior and a roof panel with outer fitting cornice is supported and anchored on ground surface or ice surface. The bunting blind is able to conceal at least one hunters/occupants within its structure, absorbs sounds, and scent from within eliminating the possibility of detection by animal's keen sense of sight, hearing and smell while keeping the occupants out of the harsh weather. The hunting blind/ice fishing hut allows said hunters/occupants ease of transport from location to location within minutes by a hand carried carrying/storage case, ease of assembly U.S. Patent Publication No. 2009/0277094 (Harris R. Ward), the entire disclosure of which is incorporated herein by reference, discloses a bunting blind with one-way windows is constructed of four rigid panels to have four walls and a fifth rigid roof panel. Preferably, at least three of the panels are provided with a window frame, the frames having multiple tracks for multiple sliding panes in each frame. The window panes are coated or formed to provide one way vision, i.e., the hunter or photographer in the blind can see out through the panes, but wildlife exterior to the blind cannot see into the blind. When the hunter wishes to make a shot, he/she slides one of the panes open to provide a clear shot to the outside from the blind. The panes may be removed and replaced with inexpensive opaque panels when the blind is unused for some time, thus allowing the one way panes to be stored and protected from damaging sunlight and ultraviolet.

This invention improves on the deficiencies of the prior art and provides an inventive portable, collapsible, human shelter for outdoors, and a method of assembling, and using the same.

PURPOSES AND SUMMARY OF THE INVENTION

The invention in one aspect is an improved, portable, collapsible, human shelter for outdoors, and a method of assembling, and using the same.

Therefore, one purpose of this invention is to provide a portable, collapsible, human shelter for outdoors, and a method of assembling, and using the same.

Another purpose of this invention is to provide a portable, collapsible, human shelter for outdoors, and a method of assembling, and using the same that can be used as a hunting blind.

Yet another purpose of this invention is to provide a portable, collapsible, human shelter for outdoors, and a method of assembling, and using the same that can be quickly assembled and then disassembled for easy installation and transportation.

Still yet another purpose of this invention is to provide a portable, collapsible, human shelter for outdoors, and a method of assembling, and using the same where the inventive shelter comprises of several modular panels that can be quickly assembled and then disassembled for easy installation and transportation.

Yet another purpose of this invention is to provide a portable, collapsible, human shelter for outdoors, and a method of assembling, and using the same, where the outer surface of the inventive shelter has a coating of at least one material to protect the inventive shelter from the outside environmental conditions.

Therefore, in one aspect this invention comprises a method of forming a portable, collapsible, lightweight housing structure, comprising the steps of:
(a) taking, a plurality of tubular members to form a tubular frame, wherein said tubular frame comprises a base tubular frame, a top tubular frame, and wherein said base tubular frame is directly connected to said top tubular frame via a plurality of connecting tubular members;
(b) a flat housing panel having a top edge and a bottom edge, said flat housing panel further comprises a first side panel, a second side panel, and at least one third side panel, and wherein the joining of said first side panel to said second side panel and said at least one third side panel forms a housing sleeve;
(c) a cover panel having a first cover sidewall and at least one second cover sidewall;
(d) wrapping said flat housing panel around said tubular frame, such that said bottom edge of said flat housing panel is secured to said base tubular frame, and said top edge of said flat housing panel is secured to said top tubular frame, and wherein said cover panel is secured to the outside of said tubular frame such that said first cover sidewall is secured to one of said first side panel of said flat housing panel, and said at least one second cover sidewall is secured to one of said second side panel of said flat housing panel; and
(e) forming at least one door in said housing sleeve for an entry and exit by at least one human, and thereby forming said portable, collapsible, lightweight housing structure.

In another aspect this invention comprises a portable, collapsible, lightweight housing structure, comprising:
(a) a tubular frame, wherein said tubular frame comprises a base tubular frame, top tubular frame, and wherein said base tubular frame is directly connected to said top tubular frame via a plurality of connecting tubular members;
(b) a flat housing panel, said flat housing panel comprising a first side panel, a second side panel, and at least one third side panel, and wherein the joining of said first side panel to said second side panel and said third side panel forms a housing sleeve, said housing sleeve having a top edge and a bottom edge;
(c) a cover panel having a first cover sidewall and at least one second cover sidewall;
(d) said flat housing panel wrapped around said tubular frame, such that said bottom edge of said flat housing panel is secured to said base tubular frame, and said top edge is secured to said top tubular frame, and wherein said cover panel is secured to the outside of said tubular frame such that said first cover sidewall is secured to one of said first side panel of said flat housing panel, and said at least one second cover sidewall is secured to one of said second side panel of said flat housing panel; and
(e) at least one door in said housing sleeve for an entry and exit by at least one human in said portable, collapsible, lightweight housing structure.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawing& The invention may best be understood by reference to the ensuing detailed description in conjunction with the drawings in which;

FIG. 26, illustrates a perspective view of a seventh embodiment for a central housing sleeve for a portable, collapsible, shelter of this invention.

FIG. 27, illustrates a top view of the inventive cover panel, and an optional base panel for the portable collapsible, shelter of this invention.

FIG. 28, illustrates a perspective view of an eighth embodiment for a central housing sleeve for a portable, collapsible, shelter of this invention.

FIG. 29, illustrates a perspective view of a fully erect and assembled tubular frame for the portable, collapsible, shelter of this invention.

FIG. 30, illustrates a perspective view of a fully erect and assembled portable, collapsible, shelter of this invention.

DETAILED DESCRIPTION

Figure 1:
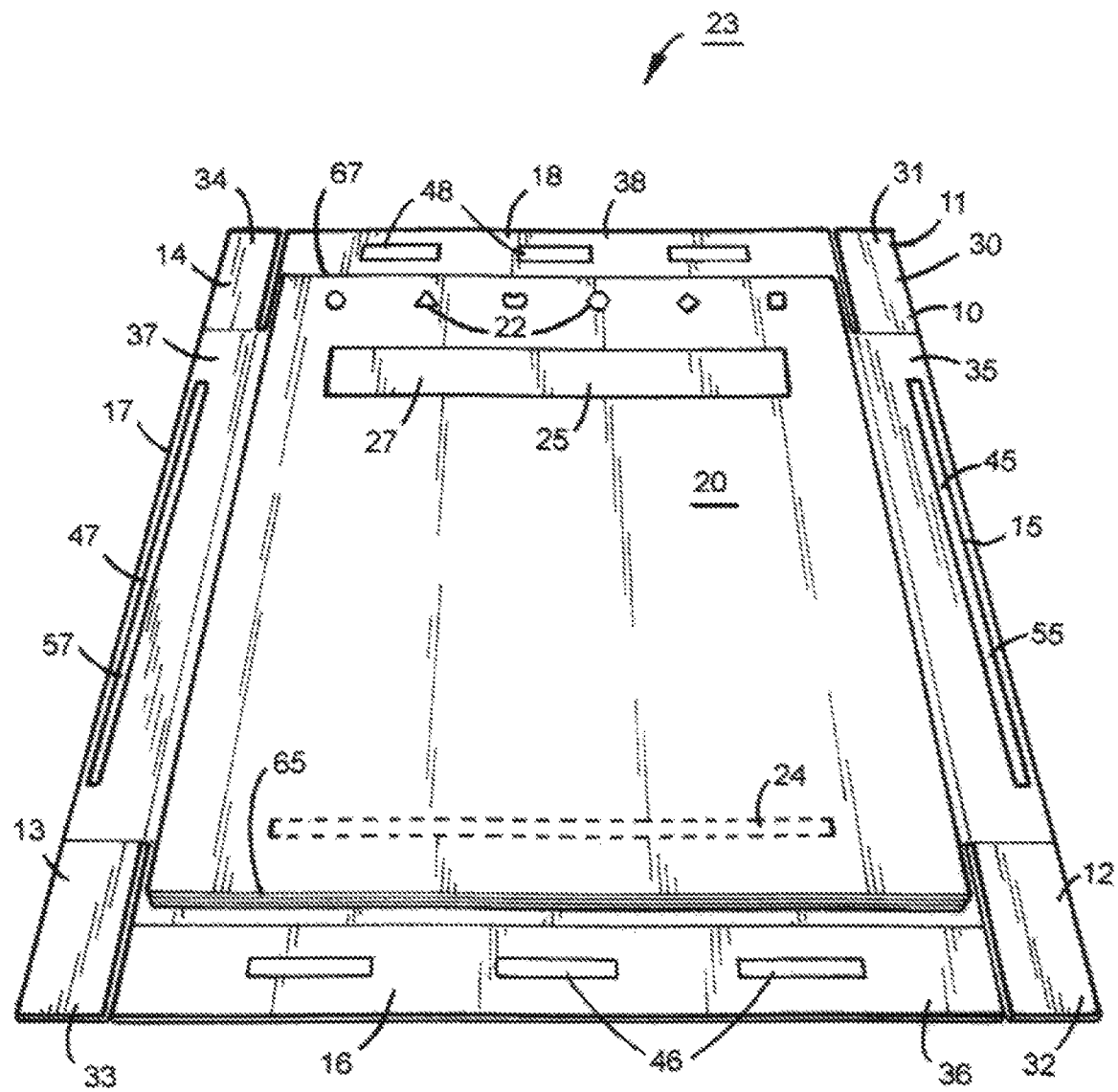
FIG. 1, illustrates a perspective view of an inventive portable, collapsible, shelter with the central housing sleeve, base, and cover while being transported.

The inventive portable, collapsible, shelter of this invention will now be discussed with reference to FIGS. 1 through 30. Although the scope of the present invention is much broader than any particular embodiment, a detailed description of the various preferred embodiments follows together with the drawings. These drawings are for illustration purposes only and are not drawn to scale. Like numbers represent like features and components in the drawings.

FIG. 1, illustrates a perspective view of an inventive portable, collapsible, shelter or blind or structure 23, according to a first embodiment where the inventive shelter or blind 23, has a central housing sleeve or sidewalk 20, a cover or a top or an upper panel 10, a base or a bottom or a lower panel 30, while being transported. The central housing sleeve or side-wall 20, has been shown in a collapsed position as it is easy for shipment, transportation, or storage. The central housing sleeve 20, is shown with at least one first securing means 22, at least one second securing means 24, and optionally, at least one third securing means 26, shown in FIG. 3. The central housing sleeve 20, has a lower or bottom edge 65, and an upper or top edge 67. For some applications it is preferred that the second securing means 24, is on the inside snake of the central housing sleeve 20, and preferably towards the lower surface or near the lower edge 65, of the central housing sleeve 20. The central housing sleeve 20, optionally, can also have at least one opening or window 25. The opening or window 25, could optionally have at least one flap or cover 27, that could be used to protect the window from the environment, such as, rain, snow, wind, etc. The cover 10 or the base 30, would preferably be similar to each other, or could be a mirror image of each other, or could be different from each other. The cover 10, or the base 30, could have a first folding panel 11, 31, a second folding panel 12, 32, a third folding panel 13, 33, and a fourth folding panel 14, 34. The folding panels 11, 12, 13, 14, far the cover 10, or the folding panels 31, 32, 33, 34, for the base 30, could also have a first extension folding panel 15, a second extension folding panel 16, a third extension folding panel 17, and a fourth extension folding panel 18. The cover 10, and/or the base 30, could have at least one securing means 45, 46, 47, and 48. It is preferred that the at least one securing means 45, 46, 47, and 48, are positioned along the edges of the folding panels 11, 12, 13, and 14, respectively.

Figure 2:
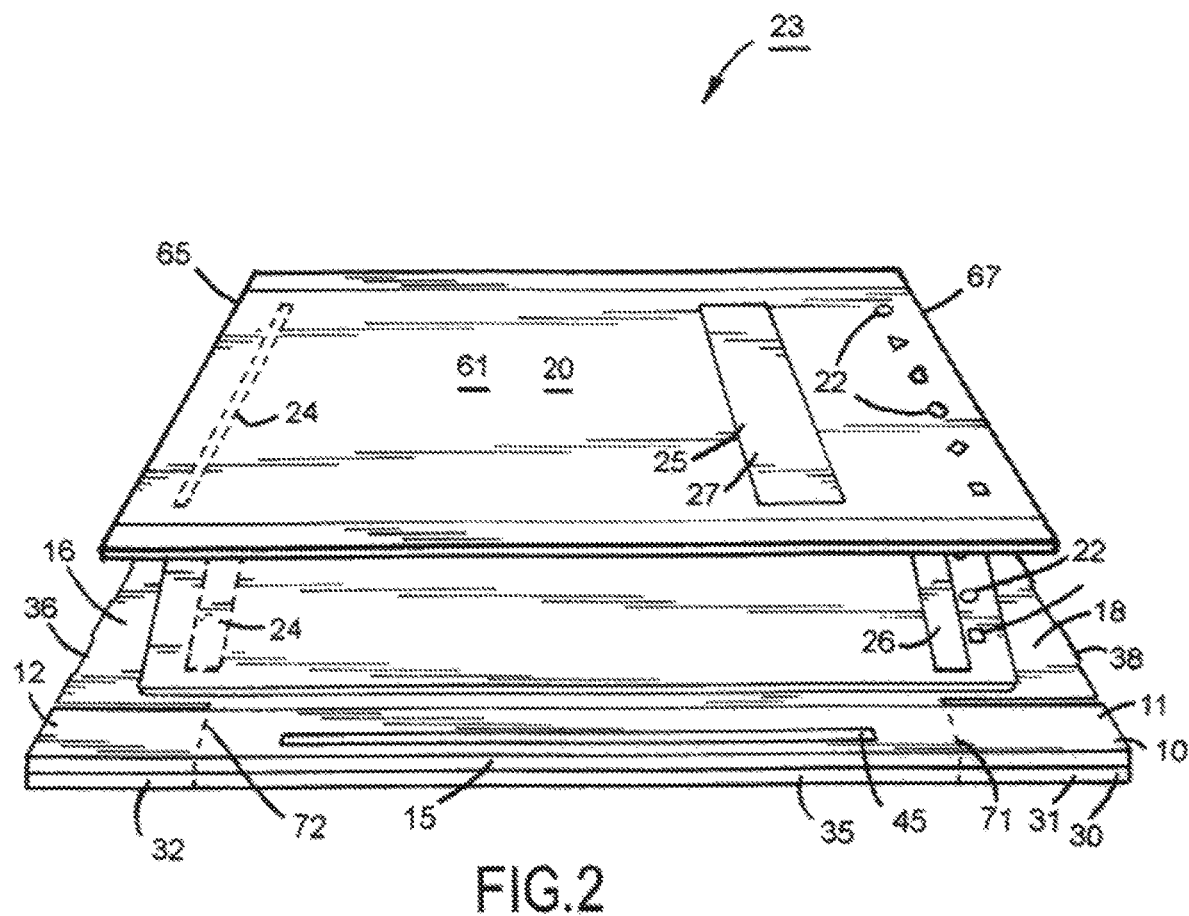
FIG. 2, illustrates a perspective view of the inventive portable, collapsible, shelter while the central housing sleeve is being removed from the base and the cover.

FIG. 2, illustrates a perspective view of the inventive portable, collapsible, shelter or blind or structure 23, of FIG. 1, while the central housing sleeve 20, is being removed from the cover panel 10, and the base panel 30. As one can see that in this embodiment the central housing sleeve 20, is opening in an accordion manner, where a first wall panel 61, is pulling, and separating from the other folded and attached panels. The central housing sleeve 20, can also have an optional or secondary securing means 26.

Figure 3:
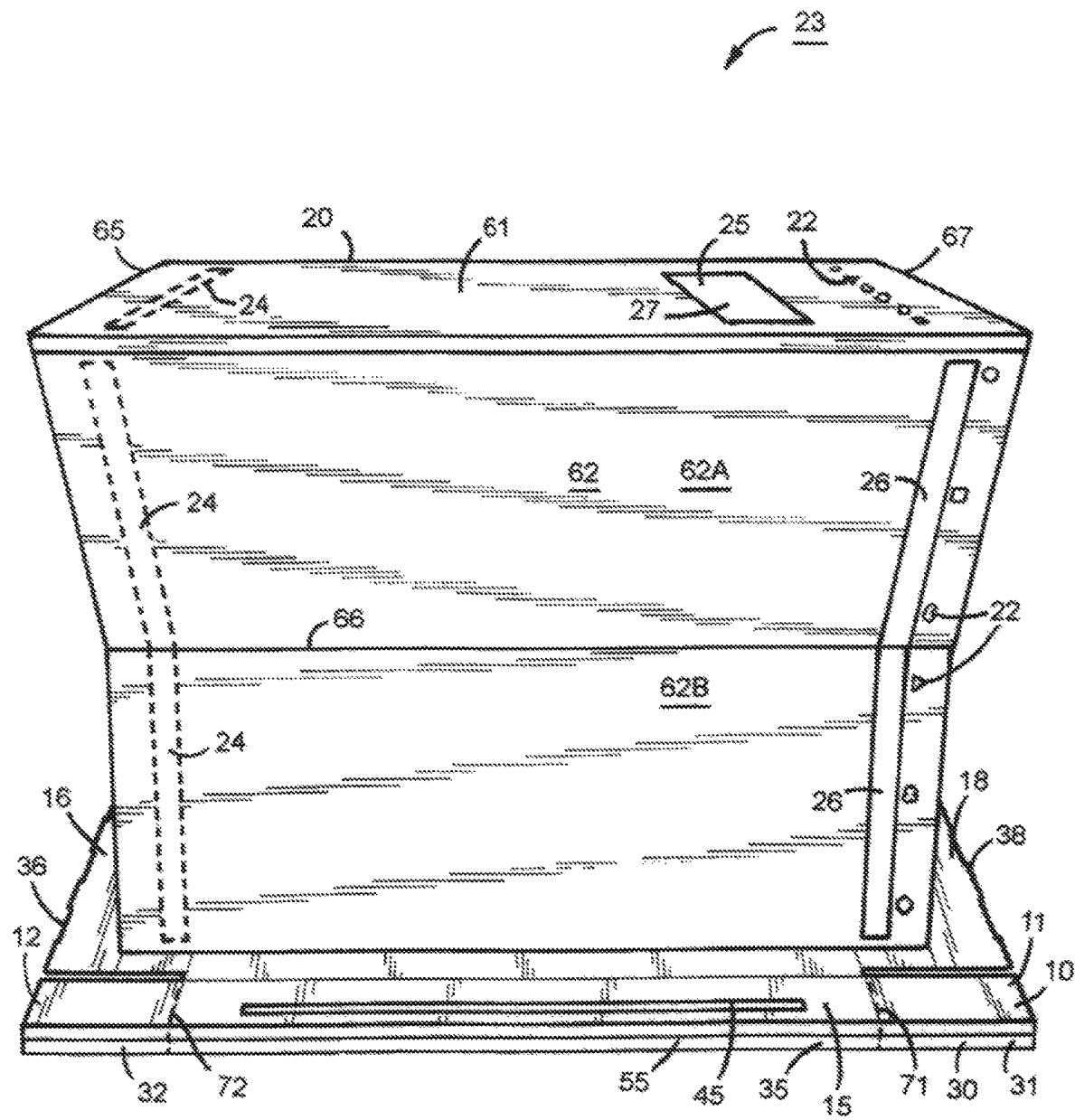
FIG. 3, illustrates a perspective view of the inventive portable, collapsible, shelter as the central housing sleeve is being expanded while the base and the cover are still on the floor of a surface.
Figure 4:
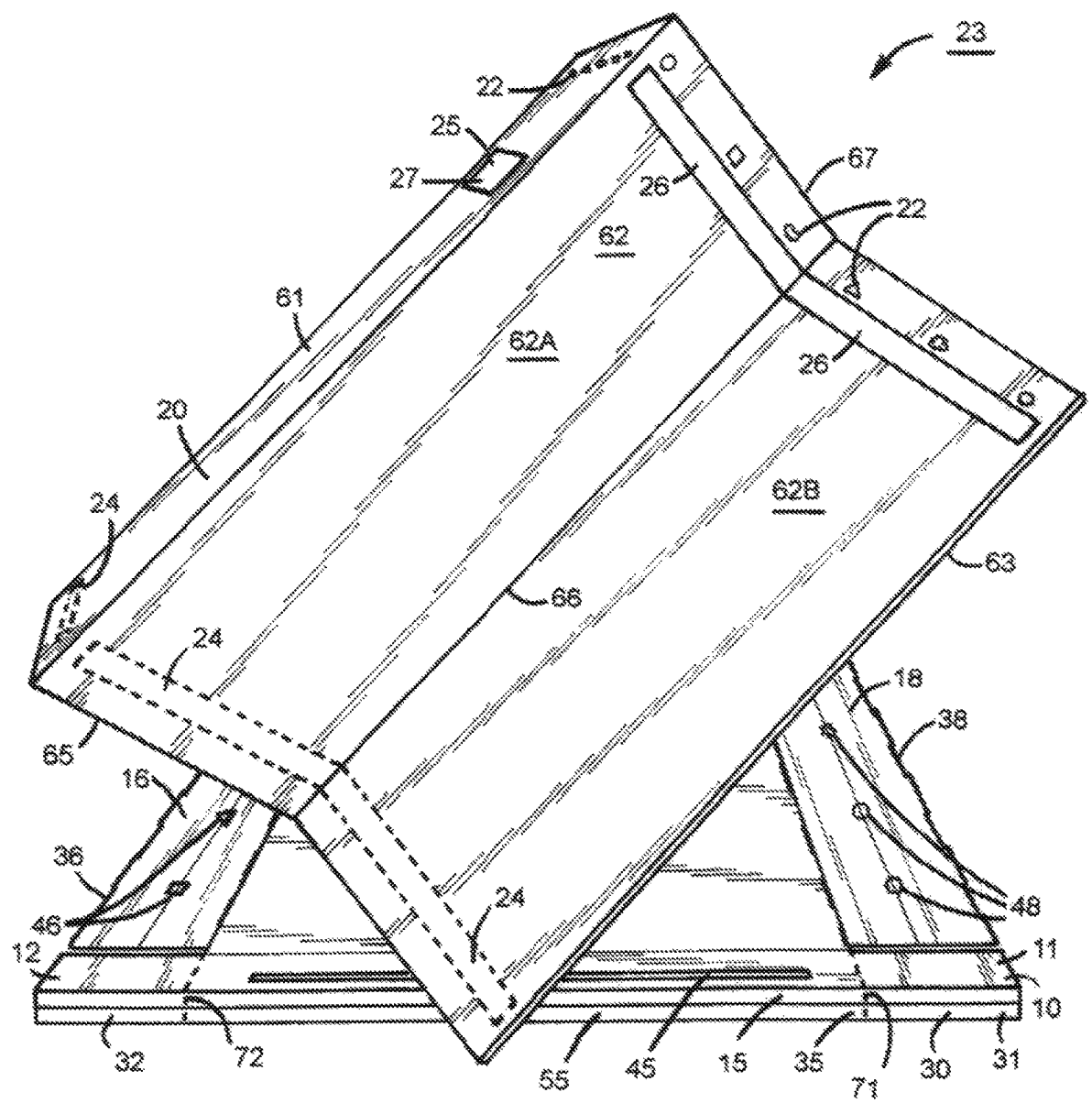
FIG. 4, illustrates a perspective view of the inventive portable, collapsible, shelter as the central housing sleeve is being expanded and being removed for erection while the base and the cover are still on the floor of a surface.

FIG. 3, illustrates a perspective view of the inventive portable, collapsible, shelter 23, of FIG. 1, where the central housing sleeve 20, is being expanded while the cover panel 10, and the base panel 30, are still on the floor of a surface. The central housing sleeve 20, has a first sidewall 61, a second sidewall 62, a third sidewall 63, shown in FIG. 5, and a fourth sidewall 54, shown in FIG. 5. As shown in FIG. 3, the second sidewall 62, comprises a first partial panel 62A, and a second partial panel 62B, which are joined to each other at the joint fold or fold line 66, that when combined form the full sidewall panel 62. The joint fold 66, also provides rotational movement to the two partial panels 62A, and 62B, with respect to each other, and also allow them to move in and out of plane of the panel 62. It should be appreciated that for some applications one could have more than two partial panels 62A, 62B, to form the full sidewall panel 62. It should be understood that the fourth sidewall or side panel 54, is similar to the second sidewall 62, and thus has a first partial panel 64A, and a second partial panel 64B, and having a fold line 68, to form the fourth sidewall panel 54, as more clearly shown in FIG. 5, FIG. 4, illustrates a perspective view of the inventive portable, collapsible, shelter 23, of the first embodiment, as the central housing sleeve 20, is being expanded and being removed for erection while the cover panel 10, and the base panel 30, are still on the floor of a surface, such as, surface or floor 120, shown in FIG. 15.

Figure 5:
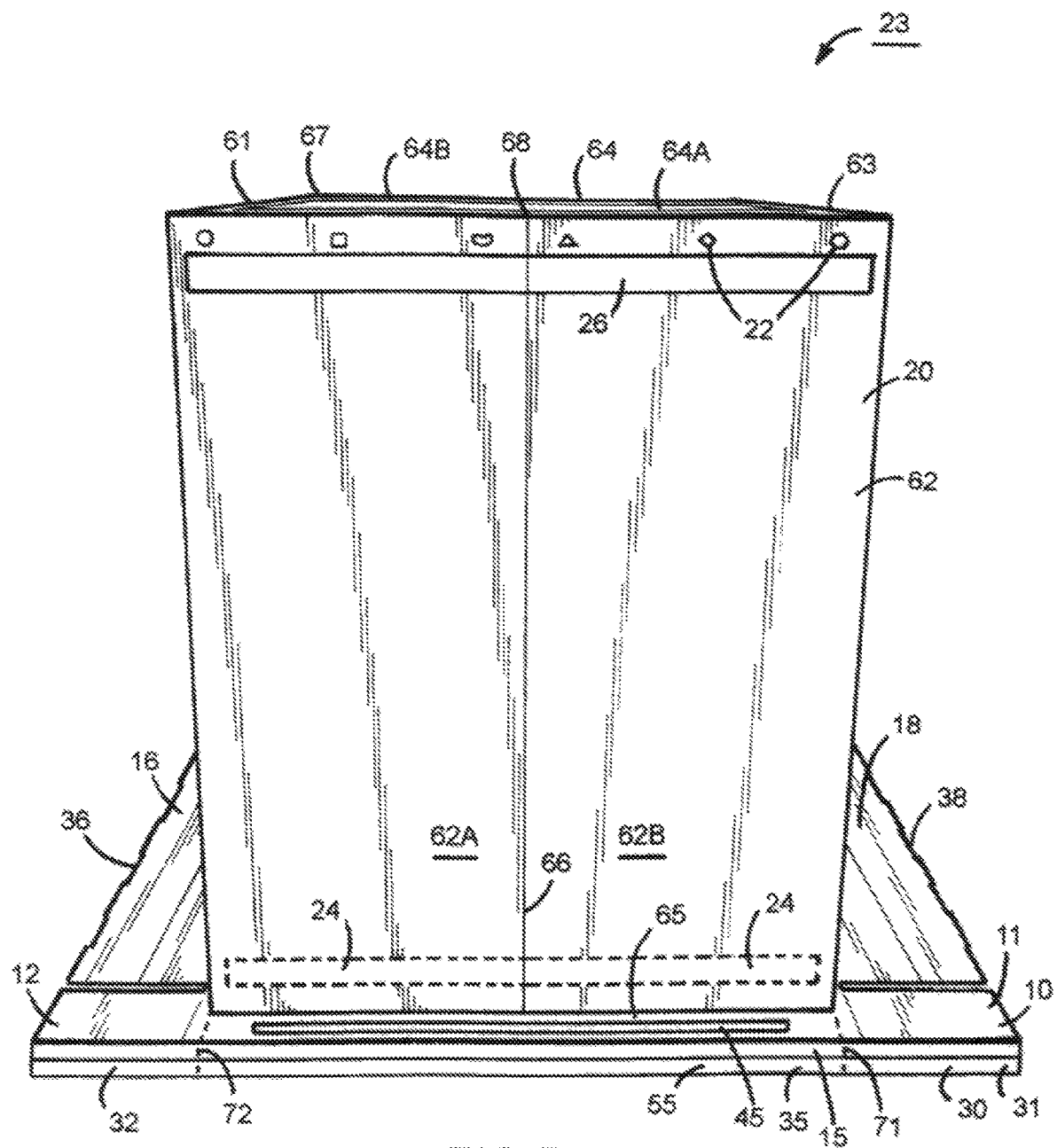
FIG. 5, illustrates a perspective view of the inventive portable, collapsible, shelter with the central housing sleeve being fully expanded and erect, while the base and the cover are still on the floor of a surface.
Figure 6:
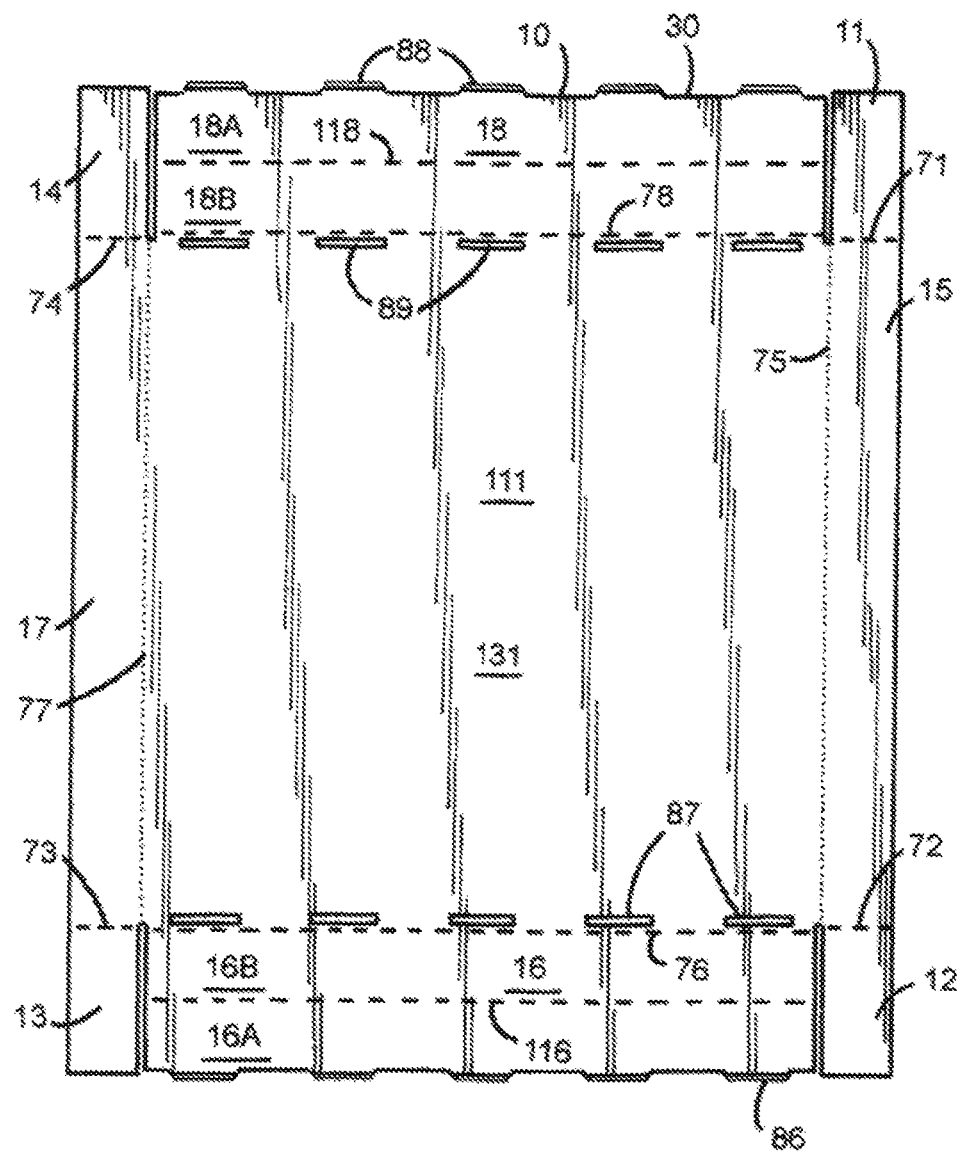
FIG. 6, illustrates a top view of the inventive cover or base of the portable, collapsible, shelter.
Figure 15:
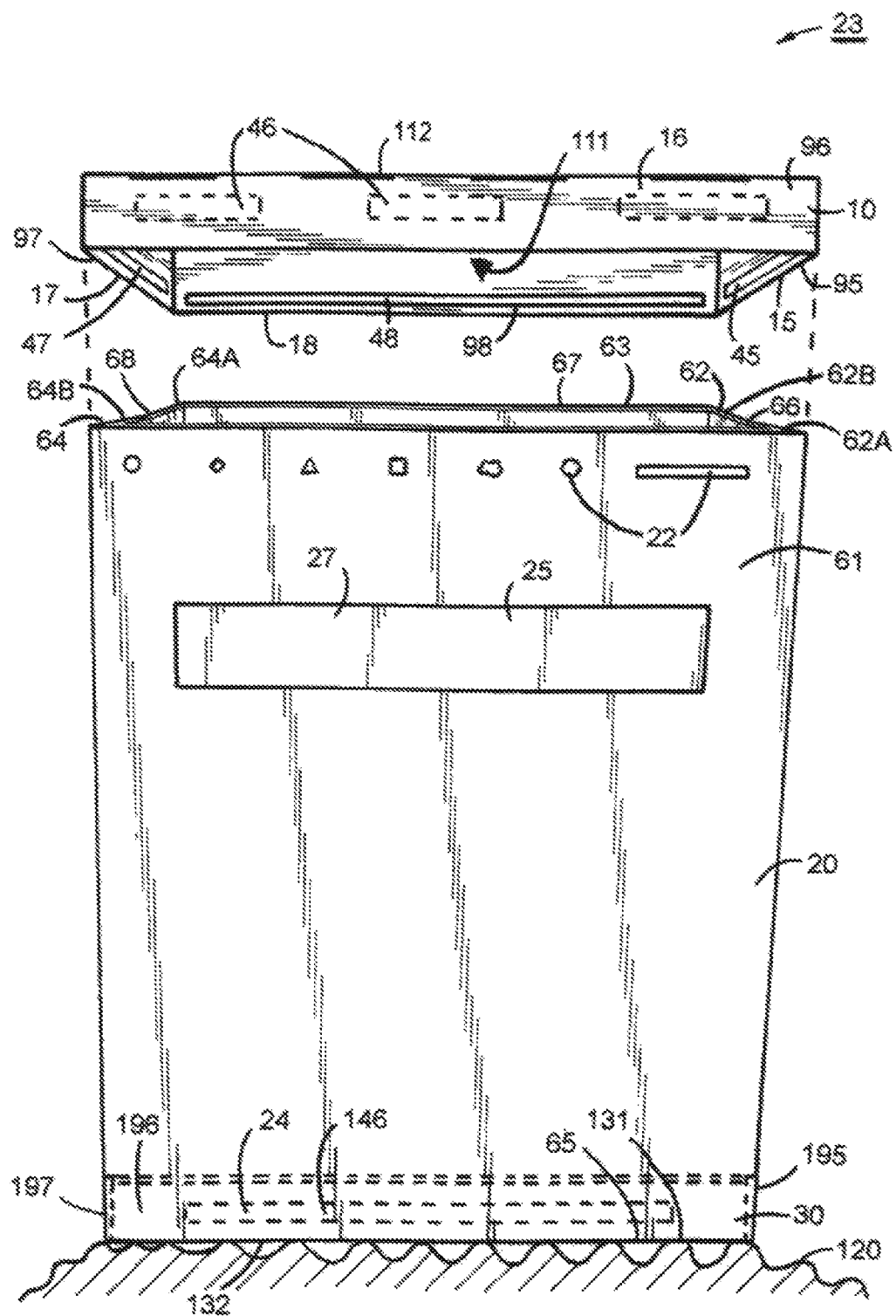
FIG. 15, illustrates a perspective view of the fully erect central housing sleeve after it has been secured to the edges of the fully erect base of the inventive portable, collapsible, shelter, and with the inventive cover being placed over the fully erect central housing sleeve.

FIG. 5, illustrates a perspective view of the inventive portable, collapsible, shelter 23, of FIG. 1, with the central housing sleeve 20, being fully expanded and erect, while the cover panel 10, and the base panel 30, are still on the floor of a surface. In order to get a substantial square, or rectangular shape for the erect central housing sleeve 20, each of the sidewall 61, 62, 63, and 64, must be in a taut position. For some applications one could use the cover panel 10, or the base panel 30, as a surface, such as, for example, surface or floor 120, shown in FIG. 15, to expand and vertically erect the central housing sleeve 20, however, any surface can be used to expand and vertically erect the central housing sleeve 20, from its folded position, FIG. 6, illustrates a top view of the inventive cover 10, or base 30, of the portable, collapsible, shelter 23. For some applications the cover 10, and the base 30, are preferably substantially identical to each other, however, it is preferable that the cover 10, is placed and secured to the top of the housing sleeve 20, along the upper or top edge 67, while the base 30, is preferably placed and secured to the bottom of the housing sleeve 20, alone the lower or bottom edge 65. The cover 10, and the base 30, have a first fold line 71, a second fold line 72, a third fold line 73, a fourth fold line 74, a fifth fold line 75, a sixth fold line 76, a seventh fold line 77, and an eighth fold line 78. The area between the fifth fold line 75, the sixth fold line 76, the seventh fold line 77, and the eighth fold line 78, creates the central cover section 110, for the cover 10, or the central base section 130, for the base 30. The fifth fold line 75, creates a first side wall panel 15, with a first flap or end panel 11, along the first fold line 71, and a second flap or end panel 12, along the second fold line 72, and each of which are located at each end of the first side wall panel 15. Similarly, at the opposite end the seventh fold line 77, creates a third side wall panel 17, with a third flap or end panel 13, along the third fold line 73, and a fourth flap or end panel 14, along, the fourth fold line 74, and each of which are located at each end of the third side wall panel 17. The area extending outwardly from the sixth fold line 76, has a ninth fold line 116, which is used to form the second side wall panel 16. The ninth fold line 116, divides the second side wall panel 16, into a top half side wall panel section 16A, and a bottom half side wall panel section 16B, that when folded form the second side wall panel 16. Similarly, on the opposite side the area extending outwardly from the eighth fold line 78, has a tenth fold line 118, which is used to form the fourth side wall panel 18. The tenth fold line 118, divides the fourth side wall panel 18, into a top half side wall panel section 18A, and a bottom half side wall panel section 18B, that when folded form the fourth side wall panel 18. The cover 10, and the base 30, have a first tongue or tab or male portion 86, and a second tongue or tab or male portion 88. Corresponding to each first tab 86, is a corresponding first hole or opening or a female potion 87. Similarly, corresponding to each second tab 88, is a corresponding second hole or opening, or a female potion 89. The cover 10, has an inner surface or area 111, and an outer surface or area 112. Thus, once the cover 10, has been folded and assembled the central cover section 110, would have the inner area 111, facing the inside and into the housing sleeve 20, while the outer surface 112, would be forming the outside surface of the blind 23. Similarly, the base 30, has an inner surface or area 131, and an outer surface or area 132. Thus, once the base 30, has been folded and assembled the central base section 130, would have the inner area 131, facing the inside and into the housing sleeve 20, while the outer surface 132, would be forming the outside surface of the blind. 23, and would be, for example, on the top of the floor or surface 120, as shown in FIG. 15.

Figure 7:
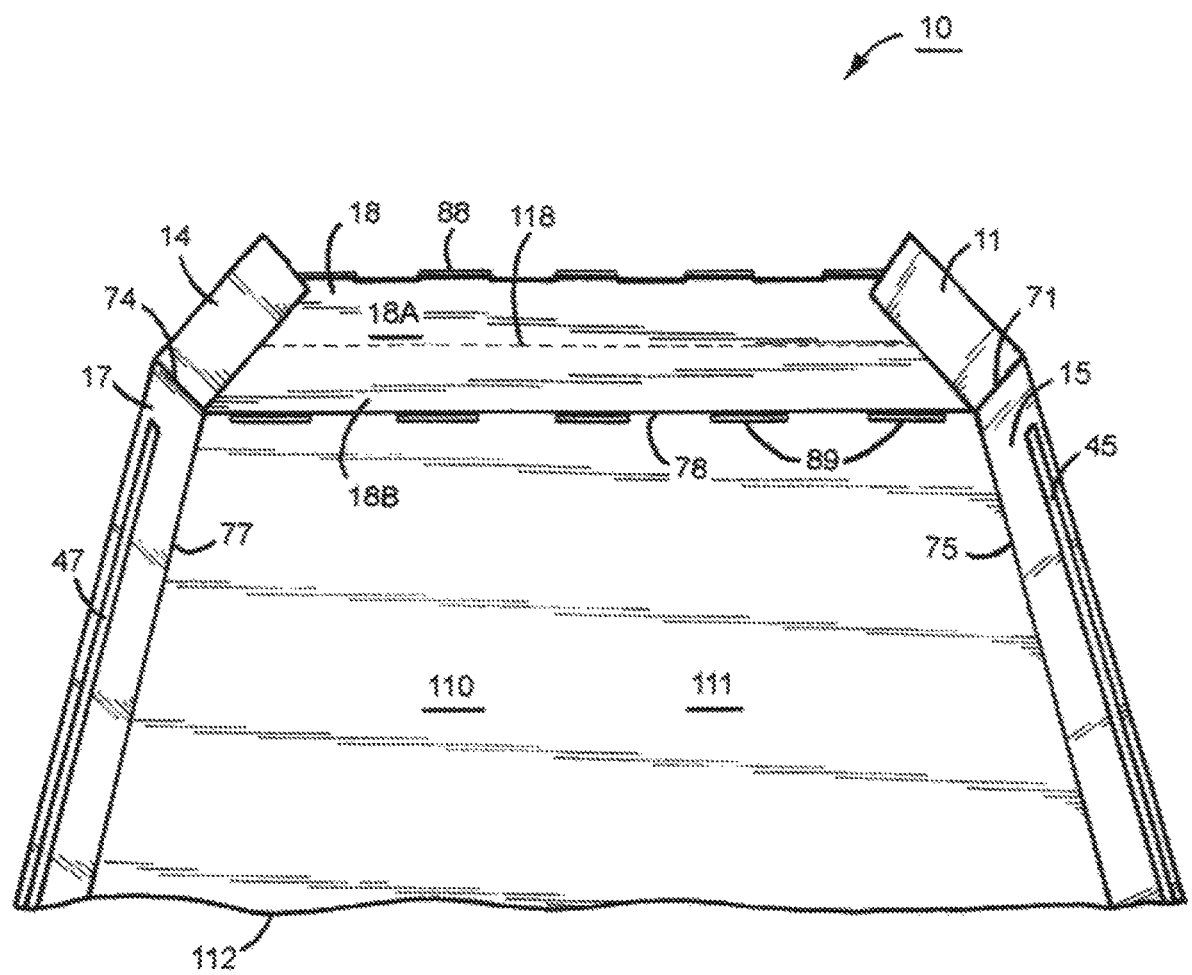
FIG. 7, illustrates a perspective view of the edge panels being folded of the inventive cover or base of the portable, collapsible, shelter.

FIG. 7, illustrates a perspective view of the edge panels being folded of the inventive cover 10, or base 30, of the portable, collapsible, shelter 23, of FIG. 1. For the ease of understanding FIG. 7, will now be described with reference to the inventive cover 10, but similar principles and features could be used for the base 30. The inventive cover 10, has the first side wall panel 15, that is folded along the fifth fold line 75. Similarly, the third side wall panel 17, is folded along the seventh fold line 77. The first end panel or tab or flap 11, is then folded inwardly along first fold line 71, and similarly, the fourth end panel or tab or flap 14, is folded inwardly along the fourth fold line 74. The fourth side wall panel 18, is then folded along the eighth fold line 78, such that the fourth side wall panel 18, is folded in half, which results in an upper half 18A, and a lower half 18B, along tenth fold line or sidewall panel dividing line 118. For the ease of understanding the second side wall panel 16, and the upper half 16A, and the lower half 16B, that are each separated by the ninth fold line 116, are not shown in FIG. 7, but they would be folded, and when finished, would appear similar to the folded portion 18. As one can see that at least one securing means 45, appears along inside peripheral edge of the first side panel 15, and similarly at least one securing means 47, appears along the inside peripheral edge of the third side panel 17.

Figure 8:
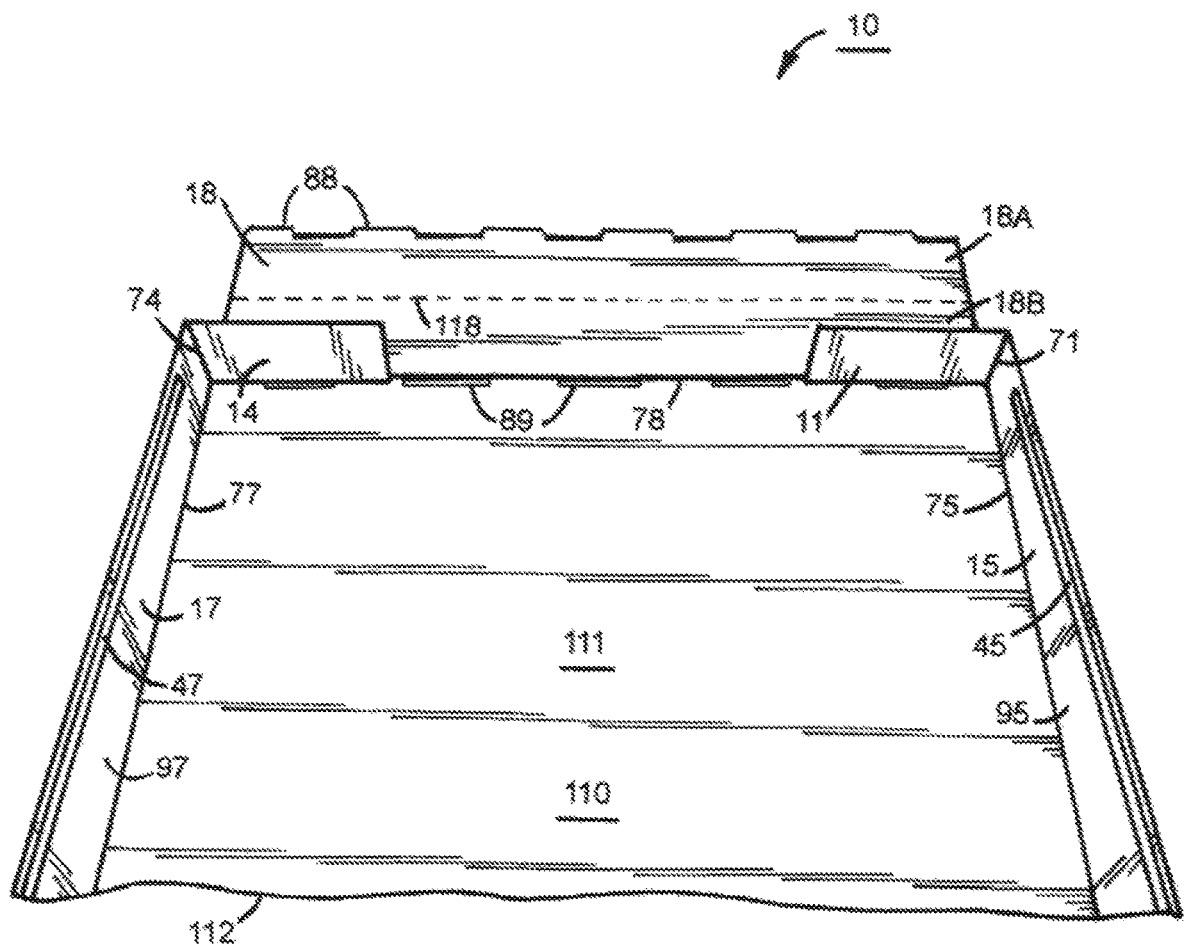
FIG. 8, illustrates a perspective view of an edge flap being folded over an edge panel of the inventive cover or base of the portable, collapsible, shelter.

FIG. 8, illustrates a perspective view of a side wall panel 18, being folded over an end panel 11, 14, of the inventive cover 10, or the base 30, of the portable, collapsible, shelter 23. The edge flap or end panel 11, 14, once folded along fold lines 71, 74, respectively, are preferably substantially vertical and are substantially in alignment along the eighth fold line 78, and the female portion or opening 89, which results in the first side wall panel 15, and the third side wall panel 17, to be also substantially vertical to the plane of the central cover section 110, along the fifth fold line 75, and the seventh fold line 77, respectively, to form a first side wall 95, and a third side wall 97, respectively.

Figure 9:
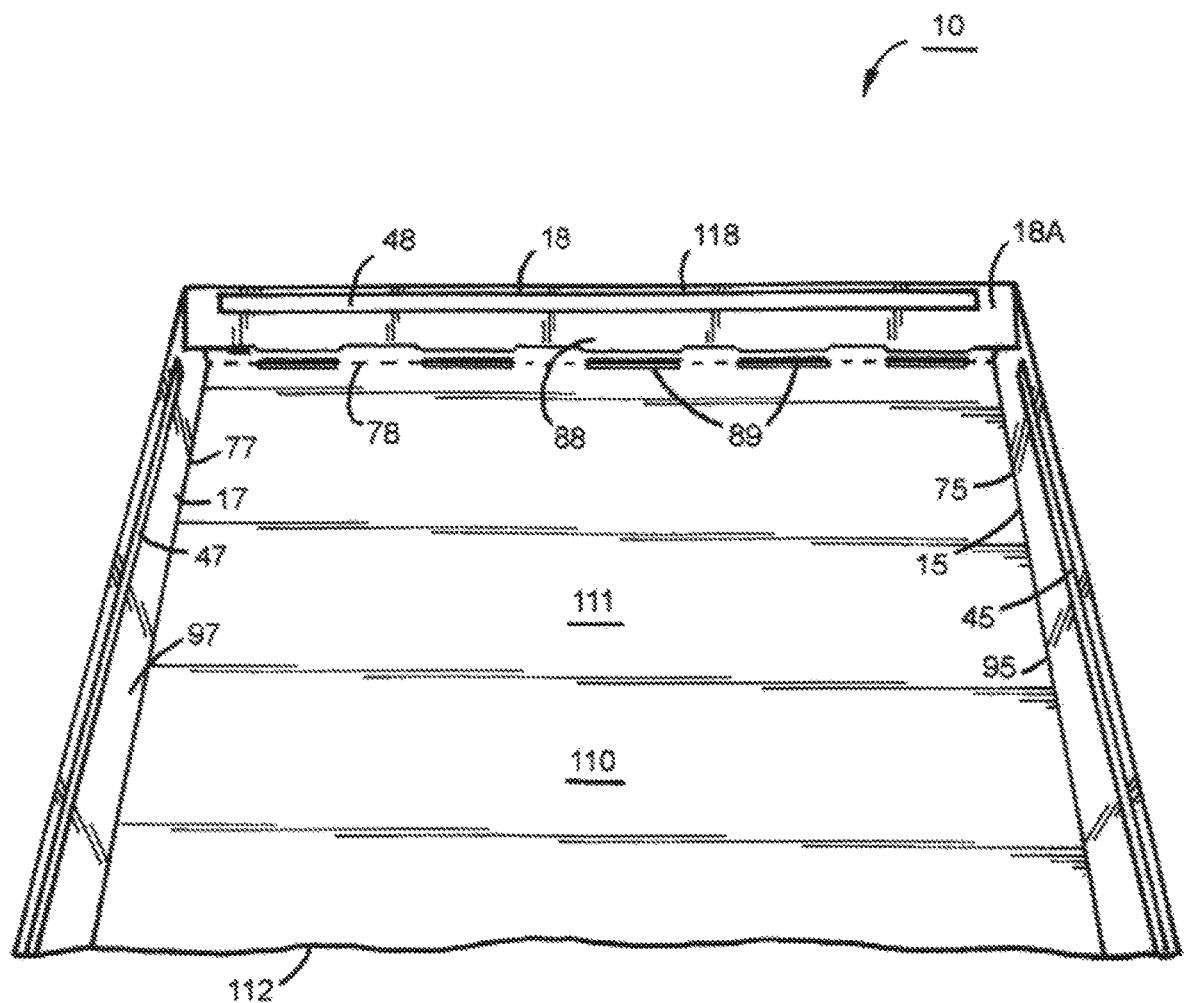
FIG. 9, illustrates a perspective view of an edge flap after being folded over an edge panel but before the end tabs have been inserted into the corresponding slots in the inventive cover of the portable, collapsible, shelter.

FIG. 9, illustrates a perspective view of a side wall panel 18, after being folded over an end panel or flap 11, 14, but before the end tabs 88, have been inserted into the corresponding slots or openings 89, in the inventive cover 10, or base 30, of the portable, collapsible, shelter 23. The fold of the forth end panel 18, is completed which results in the first half 18A, and the second half 18B, sandwiching the first flap or end panel 11, and the fourth end panel 14, and the tongue or tab or second male portion 88, being securely inserted into the corresponding hole or opening or second female portion 89. For some applications the fourth side wall panel 18, could also have at least one securing means 48. Similarly, for some applications the second side wall panel 16, could also have at least one securing means 46, as more clearly shown in FIG. 15.

Figure 10:
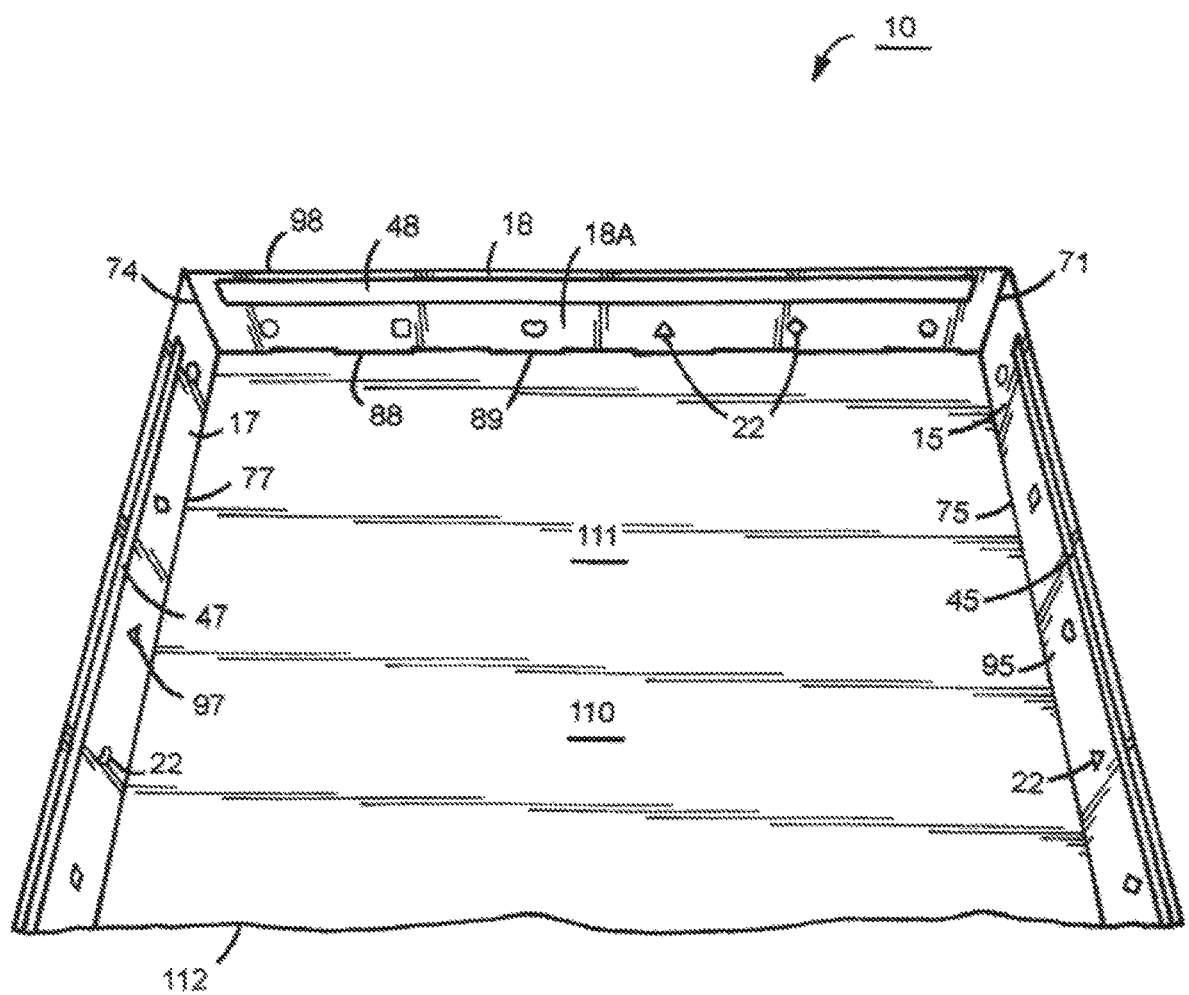
FIG. 10, illustrates a perspective view of an edge flap after being folded over an edge panel and with the end tabs been securely inserted into the corresponding slots in the inventive cover of the portable, collapsible, shelter.

FIG. 10, illustrates a perspective view of a side wall panel 18, after being folded over an end panel or flap 11, 14, and with the end tabs 88, being securely and engageably inserted into the corresponding holes or openings or slots 89, in the inventive cover 10, or base 30, of the portable, collapsible, shelter 23, to form a fourth side wall 98. Similarly, the second side wall panel 16, would be folded along the ninth fold line 116, such that the first half side wall panel 16A, and the second half side wall panel 16B, would sandwich the second flap or end panel 12, and the third flap or end panel 13, and where the tongue or tab or male portion 88, would be securely and engageably be inserted into the hole or opening 89, to form a second side wall 96, as more clearly shown in FIG. 15.

Figure 11:
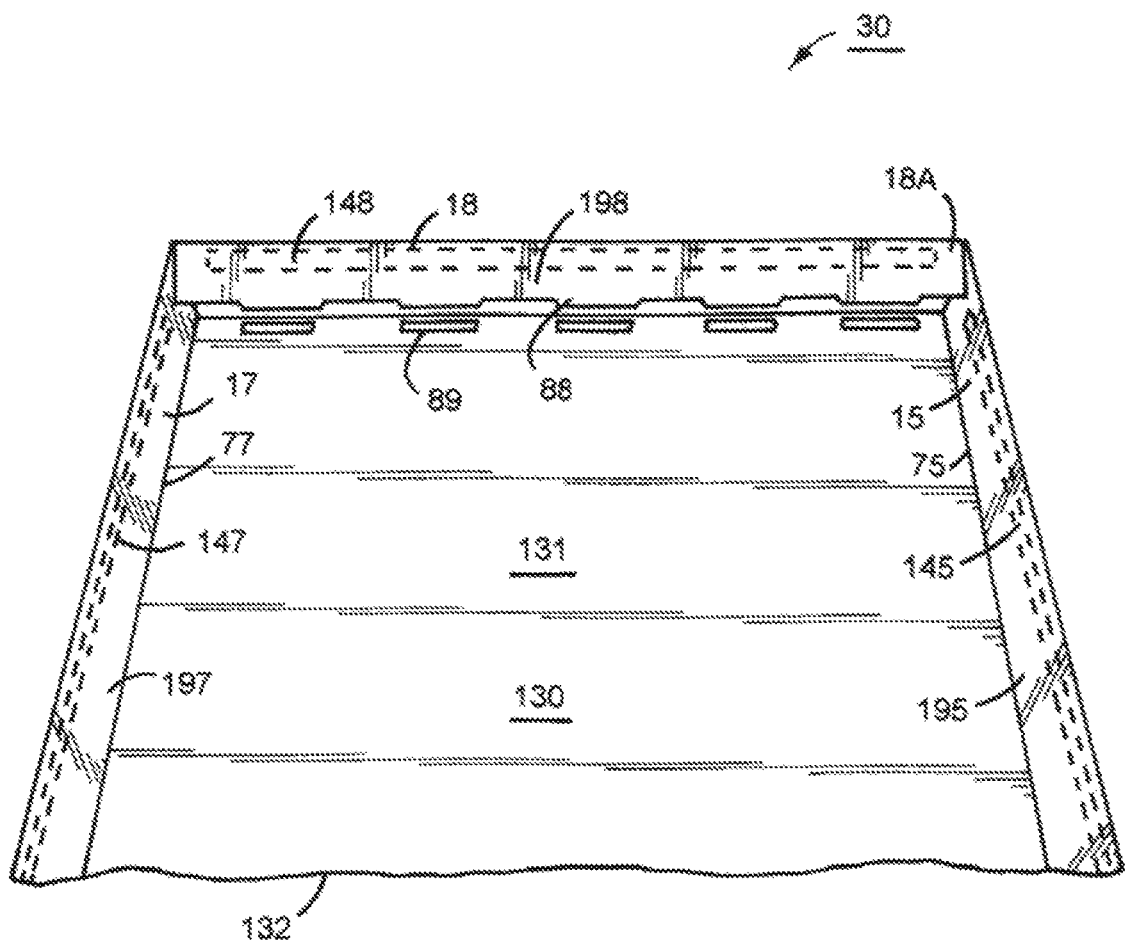
FIG. 11, illustrates a perspective view of an edge flap after being folded over an edge panel but before the end tabs have been inserted into the corresponding slots in the inventive base of the portable, collapsible, shelter.

FIG. 11, illustrates a perspective view of a side wall panel 18, after being folded over an end panel or flap 11, 14, but before the end tabs 88, have been inserted into the corresponding slots or openings 89, in the inventive base panel 30, of the portable, collapsible, shelter 23. The fold of the fourth end panel 18, is completed which results in the first half 18A, and the second half 18B, sandwiching the first flap or end panel 11, and the fourth end panel 14, and the tongue or tab or second male portion 88, being securely inserted into the corresponding hole or opening or second female portion 89. For some applications the fourth side wall panel 18, could also have at least one securing means 148, that is secured to the outside peripheral wall to form the fourth side wall 198. Similarly, for some applications the first side wall panel 15, could also have at least one securing means 145, that is secured to the outside peripheral wall to form the first side wall 195. Similarly, for some applications the third side wall panel 17, could also have at least one securing means 147, that is secured to the outside peripheral wall to form the third side wall 197. Similarly, for some applications the second side wall panel 16, could also have at least one securing means 146, that is secured to the outside peripheral wall to form the second side wall 196, as more clearly shown in FIG. 13.

Figure 12:
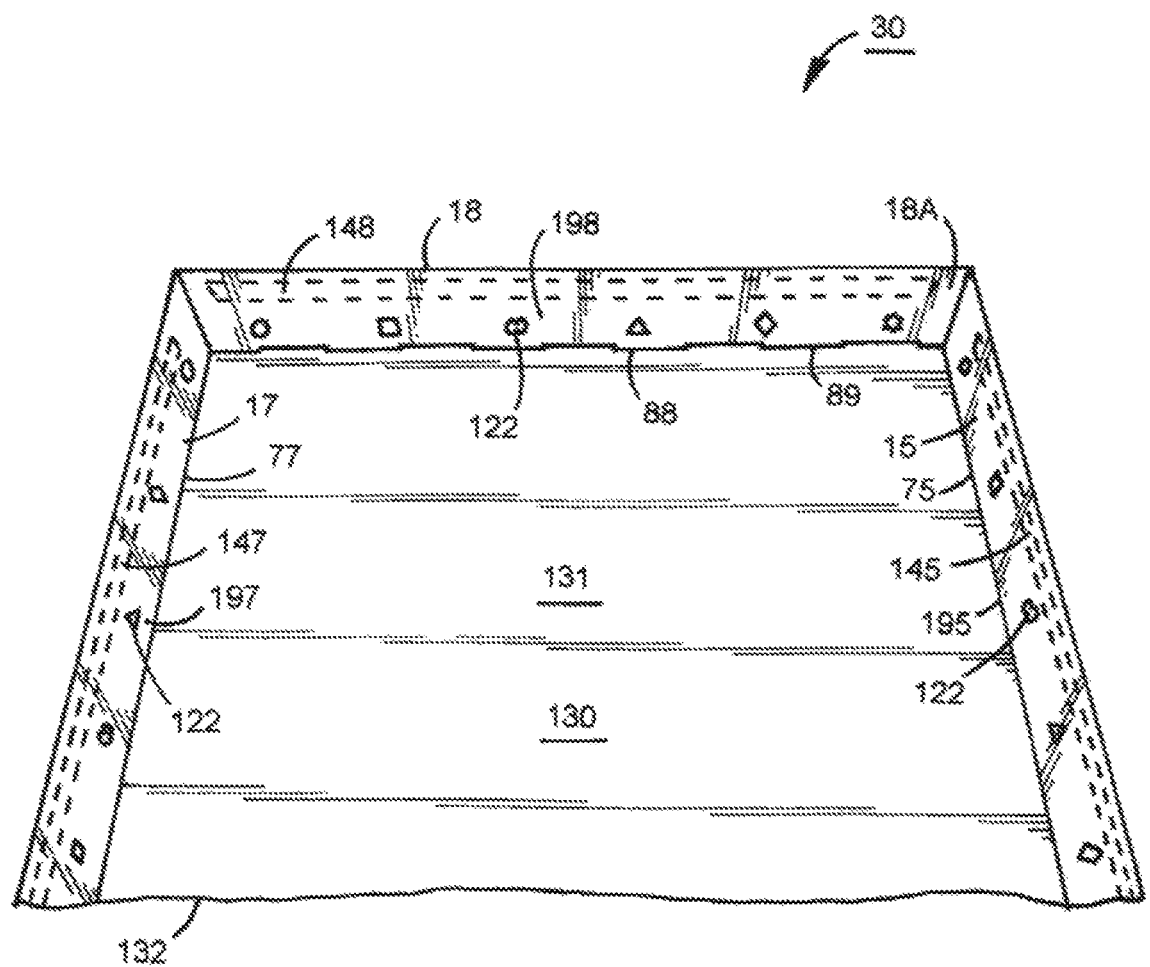
FIG. 12, illustrates a perspective view of an edge flap after being folded over an edge panel and with the end tabs been securely inserted into the corresponding slots in the inventive base of the portable, collapsible, shelter.

FIG. 12, illustrates a perspective view of a side wall panel 18, after being folded over an end panel or flap 11, 14, and with the end tabs 88, being securely and engageably inserted into the corresponding holes or openings or slots 89, in the inventive base 30, of the portable, collapsible, shelter 23, to form a fourth side wall 198. Similarly, the second side wall panel 16, would be folded along the ninth fold line 116, such that the first half side wall panel 16A, and the second half side wall panel 16B, would sandwich the second flap or end panel 12, and the third flap or end panel 13, and when the tongue or tab or male portion 88, would be securely and engageably be inserted into the hole or opening 89, to form a second side wall 196, as more clearly shown in FIG. 13. For some applications the base panel 30, has at least one first securing means 145, along the exterior surface of the first side wall 195, at least one second securing means 146 along the exterior surface of the second side wall 196, at least one third securing means 147, along the exterior surface of the third side wall 197, and at least one fourth securing means 148, along the exterior surface of the fourth side wall 198. However, it is preferred that the at least one securing means 145, 146, 147, and 148, are on the outer surface of the sidewalls 195, 196, 197, and 198, respectively, as more clearly shown with reference to FIG. 13.

Figure 13:
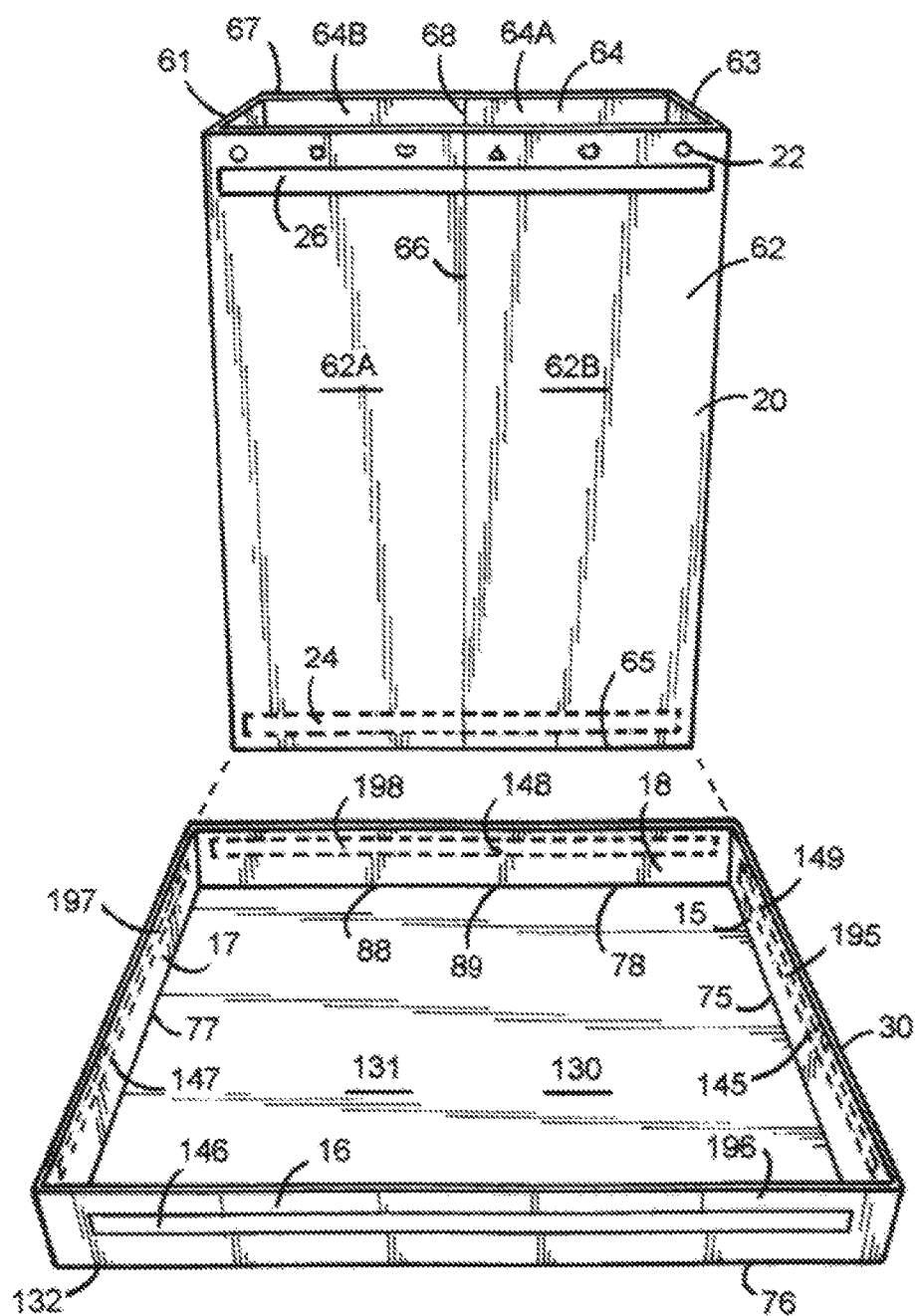
FIG. 13, illustrates a perspective view of the fully erect central housing sleeve being placed over the fully erect base of the inventive portable, collapsible, shelter.

FIG. 13, illustrates a perspective view of the fully erect central housing sleeve 20, being placed over the fully erect base 30, of the inventive portable, collapsible, shelter 23. It is preferred that the at least one securing means 24, is towards the bottom edge 65, of the sleeve 20, but on the inside wall surface of panels, such as, panels 61, 62, 63, and 64. However, for the base 30, it is preferred that the at least one securing means 145, 146, 147, and 148, are on the outer or exterior surface of the sidewalls 195, 196, 197, and 198, respectively.

Figure 14:
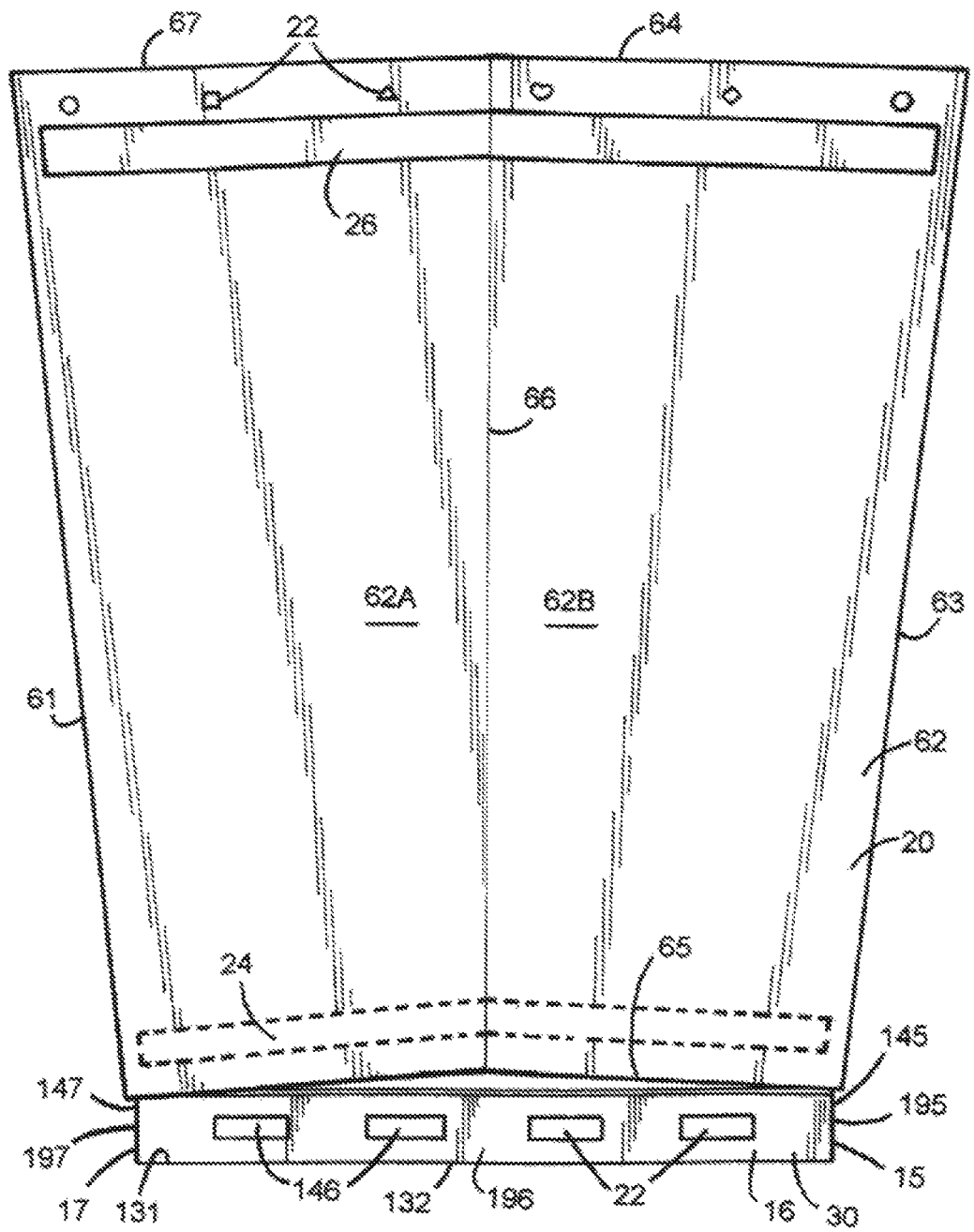
FIG. 14, illustrates a perspective view of the fully erect central housing sleeve just as it enters the edges of the fully erect base of the inventive portable, collapsible, shelter.

FIG. 14, illustrates a perspective view of the fully erect central housing sleeve 20, just as it enters the edges of the fully erect base 30, of the inventive portable, collapsible, shelter 23. As the sleeve 20, is inserted into the base panel 30, or the base panel 30, is inserted into the sleeve 20, care should be taken that the lower edge 65, and the sleeve panels 61, 62.63, and 64, are on the outside of the side walls 195, 196, 197, and 198, such that the base 30, once inserted into the sleeve 20, fully rests, and is nested inside the sleeve 20, and that the at least one securing means 24, along the inner walls of the panel 61, 62, 63, and 64, securely, and engageably are in physical contact with the at least one securing means 145, 146, 147, and 148, which are on the outer or exterior surface of the side walls 195, 196, 197, and 198, of the base panel 30.

FIG. 15, illustrates a perspective view of the fully erect central housing sleeve 20, after it has been secured to the edges of the fully erect base 30, of the inventive portable, collapsible, shelter, 23, and with the inventive cover 10, being placed over the fully erect central housing sleeve 20. It is preferred that the at least one securing means 22, are towards the top edge 67, of the sleeve 20, but on the outside or exterior wall surface of panels, such as, panels 61, 62, 63, and 64. However, for the cover 10, it is preferred that the at least one securing means 45, 46, 47, and 48, are on the inner or interior surface of the sidewalls 95, 96, 97, and 98, respectively. As the sleeve 20, is inserted into the cover panel 10, or the cover panel 10, is inserted into the sleeve 20, care should be taken that the upper edge 67, and the sleeve panels 61, 62, 63, and 64, are on the inside of the side walls 95, 96, 97, and 98, such that the cover panel 10, once inserted into the sleeve 20, fully rests, and is nested outside of the sleeve 20, and that the at least one securing means 22, along the outer or exterior walls of the panel 61, 62, 63, and 64, securely, and engageably are in physical contact with the at least one securing means 45, 46, 47, and 48, which are on the inner surface of the side walls 95, 96, 97, and 98, of the cover panel 10.

Figure 16:
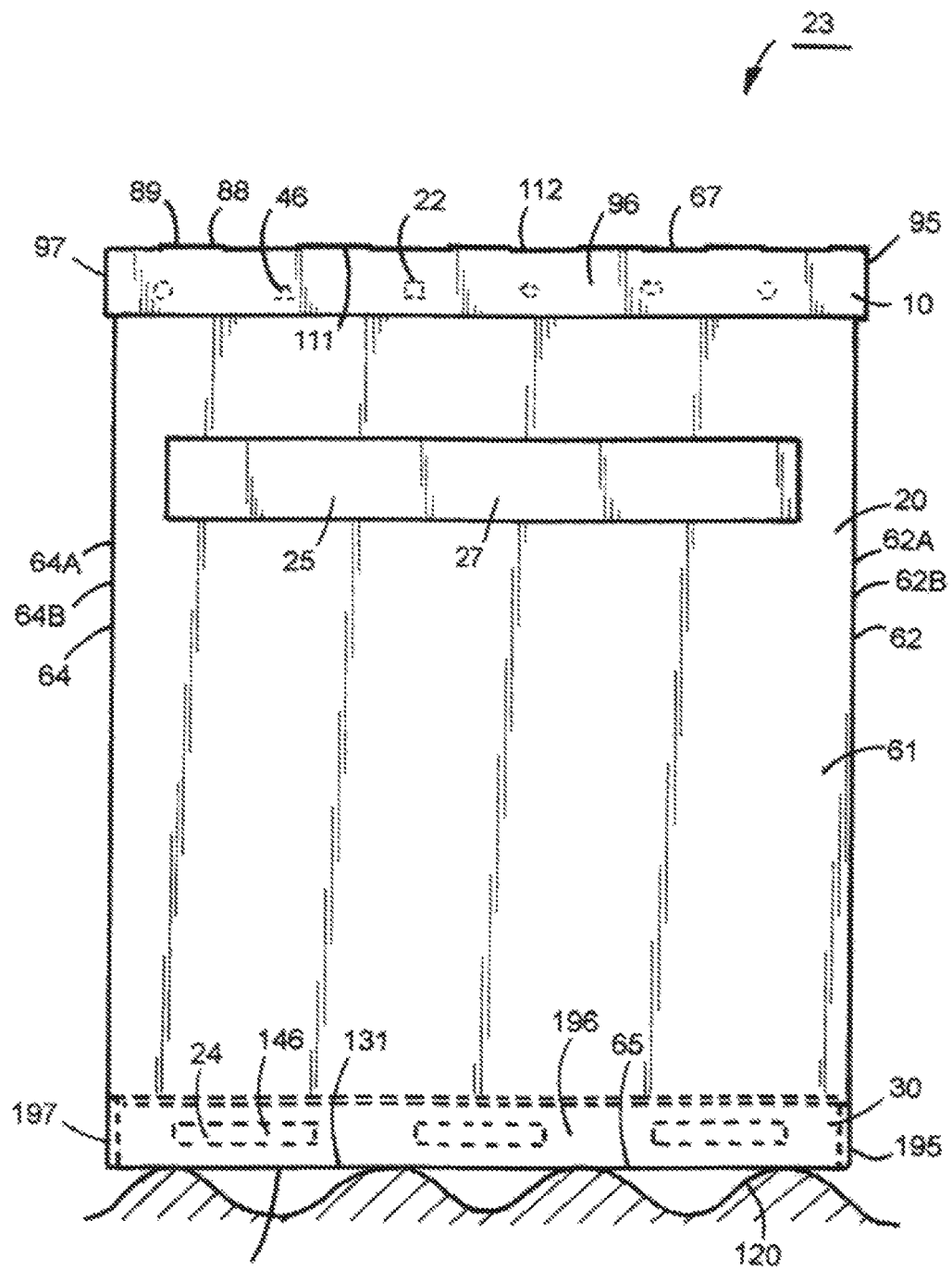
FIG. 16, illustrates a side view of a first embodiment of a fully erect and assembled portable, collapsible, shelter of this invention.

FIG. 16, illustrates a side view of a first embodiment of a fully erect and assembled portable, collapsible, shelter 23, of this invention. As one can see that the cover panel 10, is along the outer peripheral walls of the sleeve 20, so that under environmental conditions, such as, snow, rain, hail, sleet, to name a few, the environmental conditions would not penetrate inside the sleeve 20. Similarly, as one can see that the base panel 30, is along the inner peripheral walls of the sleeve 20, so that under environmental conditions, such as, snow, rain, hail, sleet, to name a few, the environmental conditions would not penetrate inside the sleeve 20. Thus, both the cover 10, and the base 30, provide environmental protection to the person or content inside the sleeve 20, of the assembled portable, collapsible, shelter 23, of this invention.

Figure 17:
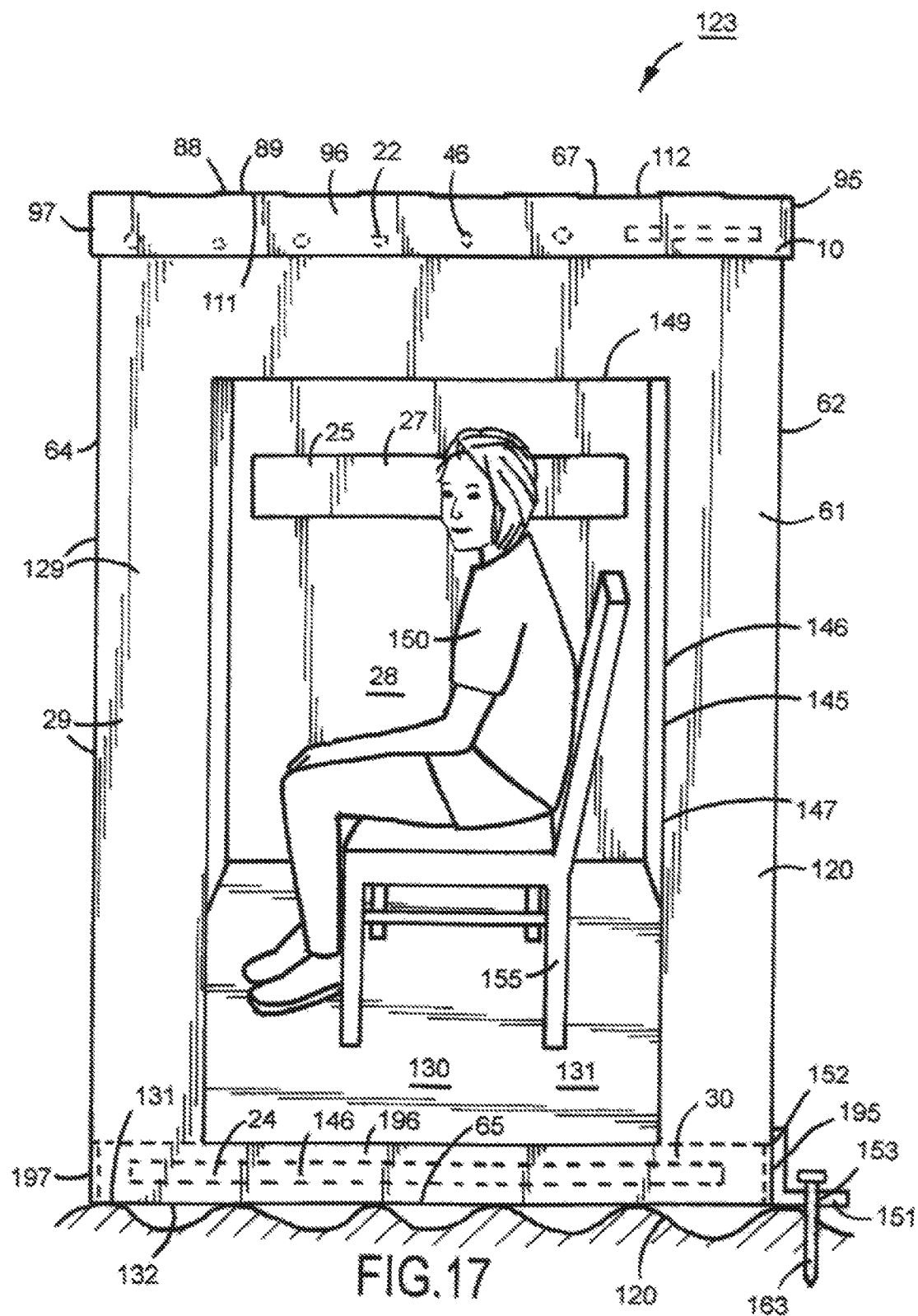
FIG. 17, illustrates a side view of a second embodiment of a hilly erect and assembled portable, collapsible, shelter of this invention.

FIG. 17, illustrates a side view of a second embodiment of a fully erect and assembled portable, collapsible, shelter or blind or structure 123, of this invention. The shelter 123, is erected or assembled in the field and is placed on a surface or terrain or ground 120, such that the second or the outer surface 131, is in contact with the ground 120, while the first or inner surface 131, faces the inside of the shelter 123. For most applications, it is preferred that the shelter 123, has an opening 147, and a door 145, which allows for an easy entrance and exit of a person or user 150, and/or content 155. It should be appreciated that the door 145, and the corresponding door opening 147, can be made in any of the panels of the sleeve 120. For most applications it is preferred that the door 145, and the door opening 147, are made when the sleeve 120, is being manufactured. However, for some applications it could be pre-formed, such as, with a door outline 149, and then in the field or as desired by the user 150, the door 145, could be created in the field or during use, such as, by cutting along the pre-formed outline 149.

As shown in FIG. 17, once assembled the structure 123, has an inner wall or surface 28, an outer wall or surface 29, an inner cover area 111, an external or outside cover area 112, an inner base area 131, and an outside or external base area 132, which would be sitting or resting on a surface or terrain 120.

As shown in FIG. 17, for some applications one could also have or secure a stake down flap or extension 151, having a hole or securing means 153, that would be secured to the outside surface 29, of the housing sleeve 120, via at least one securing means 152. For some applications one could also use a secondary or second securing means 163, such as, a stake 163, to mate with the flap 151, and to secure the structure 123, to the ground or structure 123, or to another structure, such as, for example, another portable structure 23, 123, 823, etc. For some applications one would need to add one or more stake down flap 151, on at least one side.

The stake down flap 151, could be, welded 152, or glued 152, to the bottom surface or lower edge area 65, of the outside surface 29, of the housing sleeve 120/620/720/820/825, etc. The stake down flap 151, could have a hole 153, so that one could drive a stake 163, through the hole 153, into the ground 120, and now the entire unit 123, would be staked down to the ground 120, on at least one side, and this would prevent the portable structure or hunting blind 123, from flying away under high wind conditions.

For some applications the inventive unit once assembled could have a stretchable fabric cover 129, such as, shown in FIG. 17, over the inventive unit 123, so as to change the appearance. For example, in one application, such as, a hunting blind 123, one could have a camouflage cover 129, but as a children's "Play House", the fabric cover 129, could be printed, for example, like, a spaceship, a castle, a pink play house, to name a few. Basically, the cover 129, can change the appearance of the structure 123, to whatever design 129, a child 150, a hunter 150, a person 150, a user 150, may want or desire.

Figure 18:
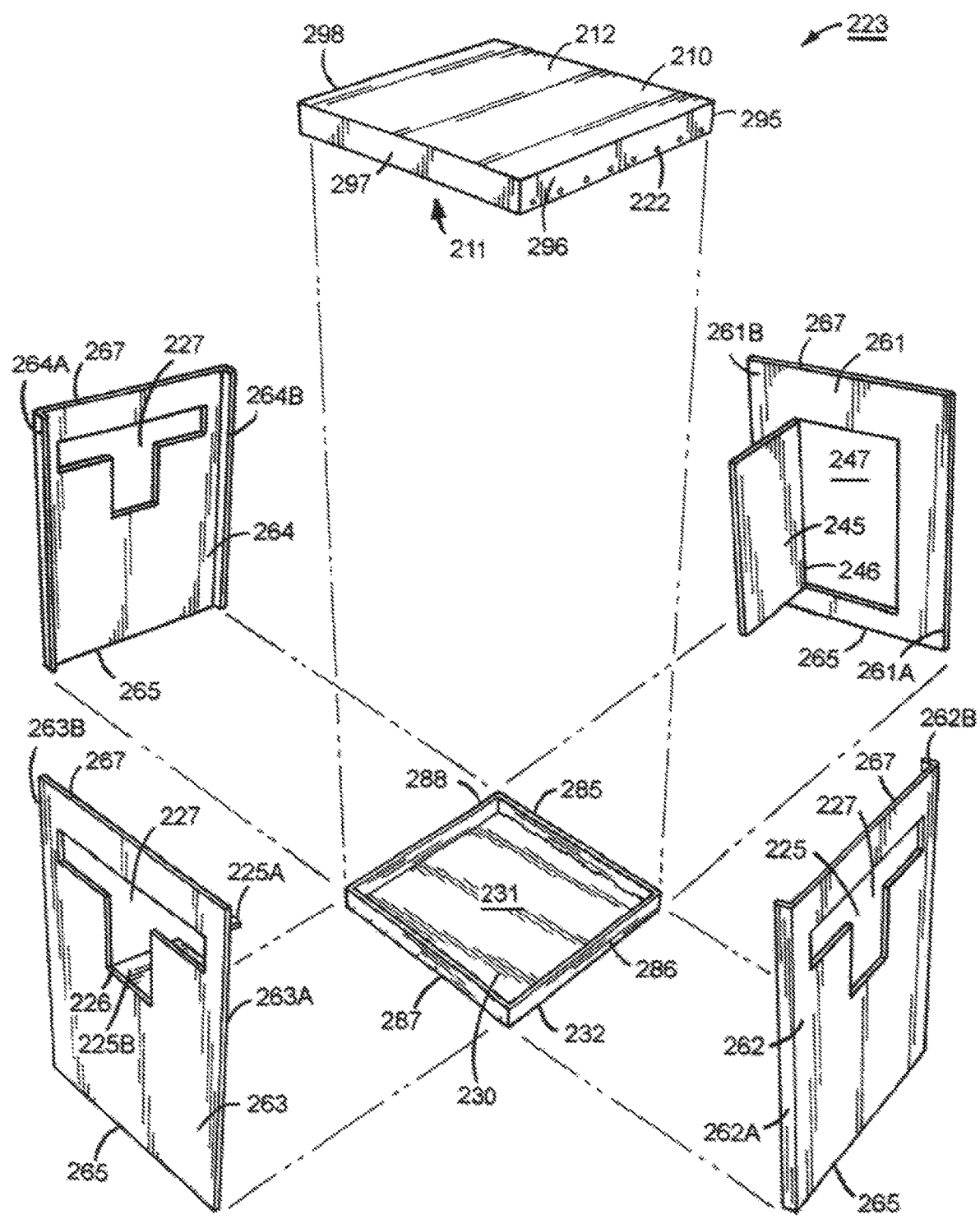
FIG. 18, illustrates an exploded perspective view of a third embodiment of a portable, collapsible, shelter of this invention.

FIG. 18, illustrates an exploded perspective view of a third embodiment of a portable, collapsible, shelter 223, of this invention. The shelter 223, comprises of individual components, which are assembled to form the portable, collapsible, shelter 223, of this invention. The shelter 223, comprises of a cover panel 210, a base panel 230, a first wall or sleeve panel 261, a second wall or sleeve panel 262, a third wall or sleeve panel 263, and a fourth wall or sleeve panel 264. One or more of the panels 261, 262, 263, 264, could have an opening 247, and a door 245. Similarly, one or more of the panels 261, 262, 263, 264, could have one or more opening 227, for a window panel 225. The window panel 225, would preferably be in an hinged arrangement with the sleeve panel 261, 262, 263, 264, such as, along a fold line 226, which could act as a hinge 226. Each of the sleeve panel 261, 262, 263, 264, would have an edge area to allow for the secure mating of the adjacent panel to it. Thus, first sleeve panel 261, would have a first sleeve edge 261A, and a second sleeve edge 261B, and a second sleeve panel 262, would have a third sleeve edge 262A, and a fourth sleeve edge 262B, and a third sleeve panel 263, would have a fifth sleeve edge 263A, and a sixth sleeve edge 263B, and a fourth sleeve panel 264, would have a seventh sleeve edge 264A, and an eighth sleeve edge 264B. Thus, for example, the first sleeve edge 261A, would mate with the second sleeve edge 262B, and the third sleeve edge 262A, would mate with the fourth sleeve edge 263A, and the fifth sleeve edge 263B, would mate with the sixth sleeve edge 264A, and the seventh sleeve edge 264A, would mate with the eighth sleeve edge 261B. Thus, once the all the edges of the panels 261, 262, 263, and 264, are mated to form the sleeve 220, shown in FIG. 19, which would be similar to the sleeve 20, the cover 210, would then be securely and engageably be mated with the upper edge 267, of the panels 261, 262, 263, and 264. Similarly, the base 230, would also be securely, and engageably be mated with the lower edge surface 265, of the sleeve 220, shown in FIG. 19, which would be similar to the sleeve 20. The cover panel 210, has an inner surface or area 211, and an outer surface or area 212. Thus, once the cover 210, has been folded and assembled the cover panel 210, would have side walls 295, 296, 297, 298, and an inner area 211, facing the inside and into the housing sleeves 220, while the outer surface 212, would be forming the outside surface of the blind 223. Similarly, the base panel 230, has an inner surface or area 231, and an outer surface or area 232. Thus, once the base panel 230, has been folded and assembled the base panel 230, would have side walls 285, 286, 287, 288, and an inner area 231, facing the inside and into the housing sleeve 220, while the outer surface 232, would be forming the outside surface of the blind 223, and would be, for example, on the top of the floor or surface 120, as shown in FIG. 15. The cover panel 210, could have one or more securing means, such as, securing means 222, that would be on the inside surface of the side walls 295, 296, 297, 298, and would securely engage and mate with the upper edges 267, of the sleeve panels 261, 262, 263, 263, and thus the sleeve panels 261, 262, 263, 253, would be engaged with but on the inside surface of the side walls 295, 296, 297, 298, as more clearly shown in FIG. 19. Similarly, the base panel 230, could have one or more securing means, such as, securing means 224, that would be on the outside surface of the side walls 285, 286, 287, 288, and would securely engage and mate with the lower edges 265, of the sleeve panels 261, 262, 263, 263, and thus the sleeve panels 261, 262, 263, 263, would be engaged with but on the outside surface of the side walls 285, 286, 287, 288, as more clearly shown in FIG. 19.

Figure 19:
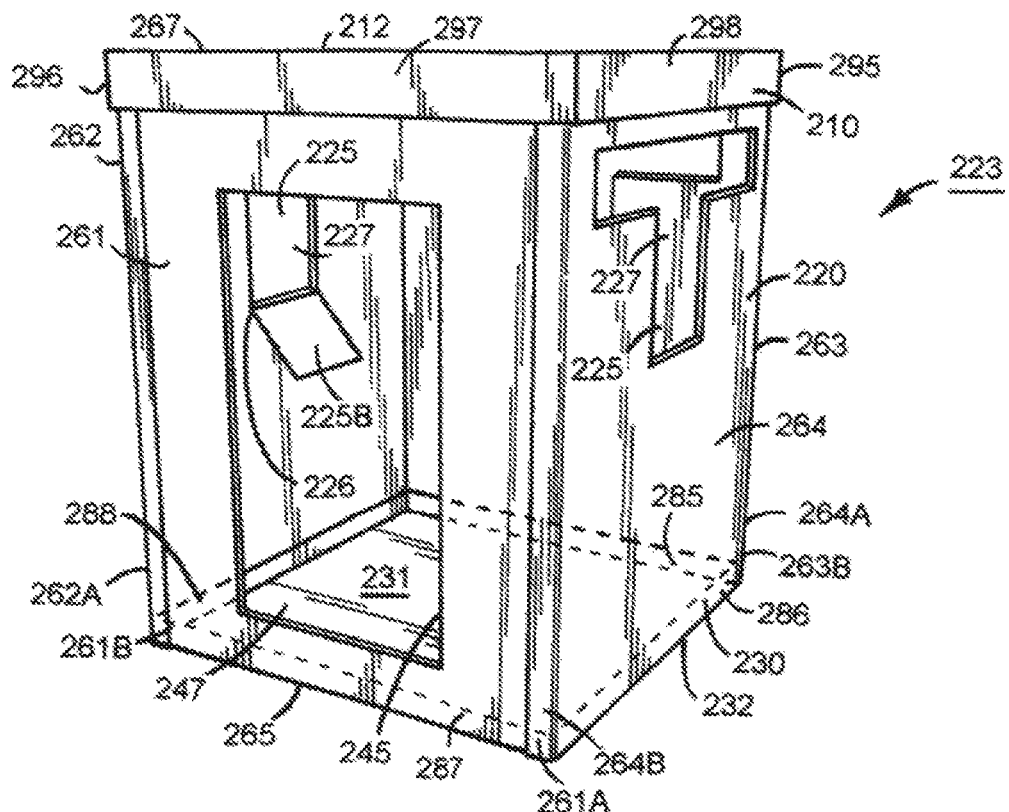
FIG. 19, illustrates a perspective view of a fourth embodiment of a fully erect and assembled portable, collapsible, shelter of this invention.

FIG. 19, illustrates a perspective view of a fully erect and assembled portable, collapsible, shelter 223, of this invention, according to the third embodiment of FIG. 18. It is preferred that the cover 210, having the side walls 295, 296, 297, 298, extends over the four peripheral walls or sleeves 261, 262, 263, 264, of the sleeve housing 220, of the shelter 223, such that the upper edge 267, is on the inside of the peripheral walls of the cover 210. However, it is preferred that the base 230, having the side walls 285, 286, 287, 288, is contained inside the four peripheral walls or sleeves 261, 262, 263, 264, of the sleeve housing 220, of the shelter 223. The edge tab or lip 261A, 261B, 262A, 262B, 263A, 263B, 264A, 264B, are secured to the corresponding edge so as to form a very secure walls for the shelter 22.

Figure 20:
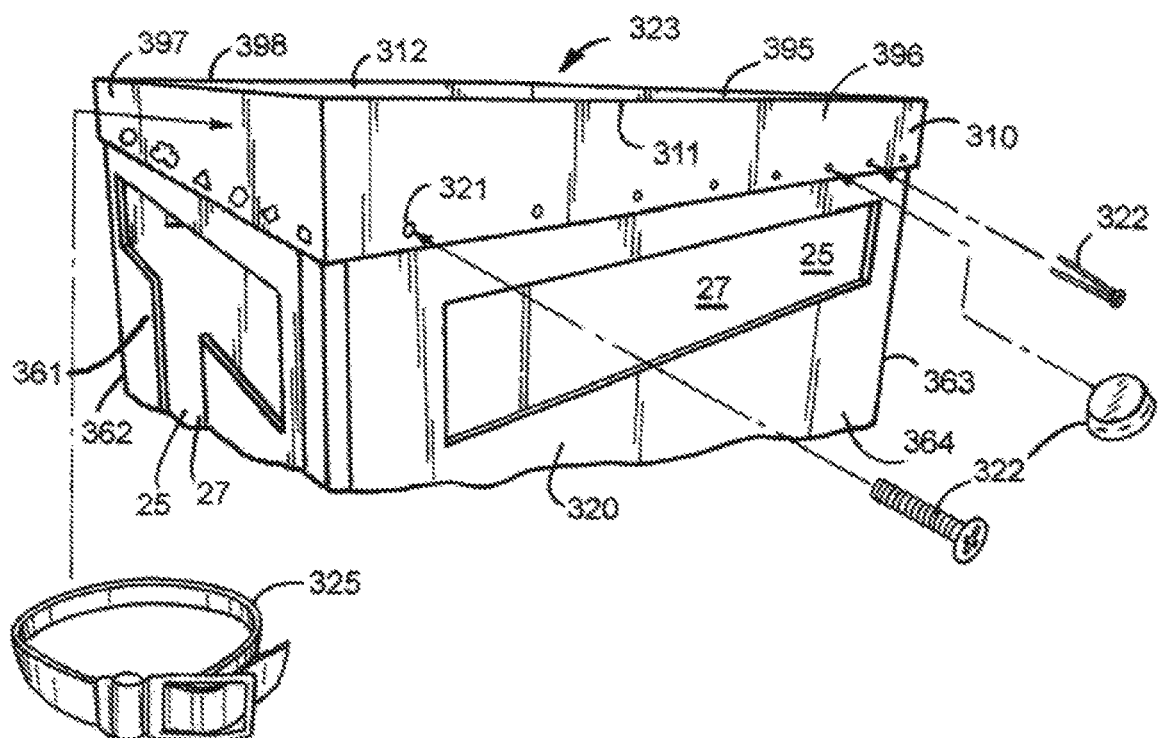
FIG. 20, illustrates a perspective upper view of a fifth embodiment of a fully erect and assembled portable, collapsible, shelter of this invention.

FIG. 20, illustrates a perspective upper view of a fourth embodiment of a fully erect and assembled portable, collapsible, shelter 323, of this invention. The shelter 323, has a sleeve housing 320, having peripheral walls or sleeve 361, 362, 363, 364. The shelter 323, has a cover 310, that has an inner or lower surface 311, an upper or outer surface 312, and peripheral edge walls 395, 396, 397, 398. The peripheral edge walls 395, 396, 397, 398, of the cover 310, are placed over the sleeve housing 320, so as to completely envelope the upper edge 367, by the peripheral edge walls 395, 396, 397, 398. For some applications the peripheral edge wall 395, 396, 397, 398, could also have at least one opening or hole 321, for the penetration of at least one securing means 322. For some applications one could also use at least one securing means 325, such as, a belt 325, to secure the peripheral edge wall 395, 396, 397, 398, of the cover 310, to the peripheral walls or sleeve 361, 362, 363, 364, of the sleeve housing 320. The shelter 323, could be similar to the shelter 20, 223, discussed earlier, however, the shelter 323, has additional securing devices 322, and/or 325, to further secure the cover 310, to the peripheral walls of the sleeve housing 320, to form the shelter 373.

Figure 21:
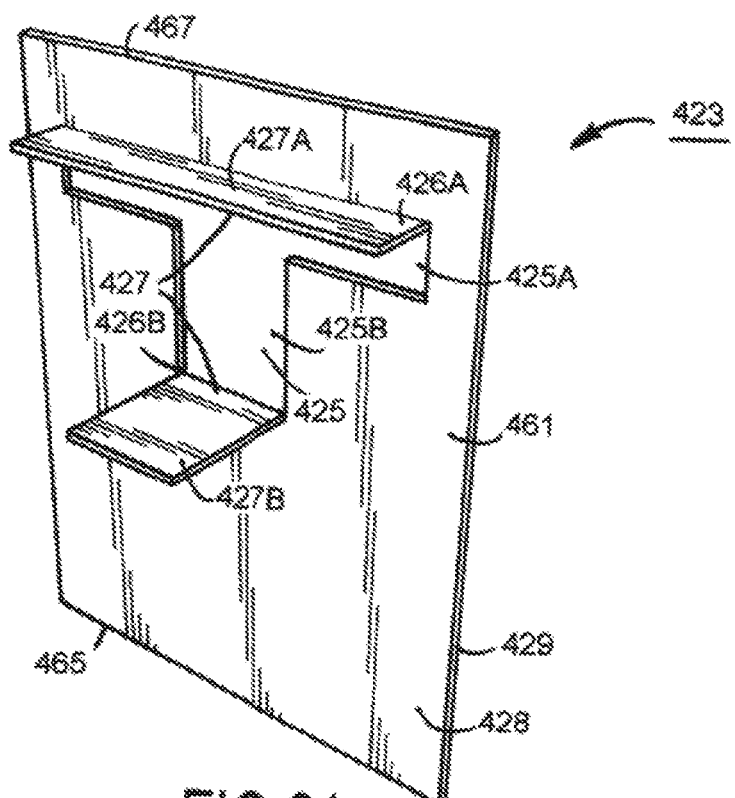
FIG. 21, illustrates a perspective view of a window flap for a wall or sleeve for a portable, collapsible, shelter of this invention.

FIG. 21, illustrates a perspective view of an upper or first window flap 427A, and a lower or second window flap 427B, for a wall or sleeve 461, for a portable, collapsible, shelter 423, of this invention. The upper or first window flap 427A, and/or the lower or second window flap 427B, create an opening or window 425, in the inventive wall or panel or sleeve 461. The wall or panel 461, has a lower or first edge 465, and an upper or second edge 467. The lower or first edge 465, would be secured to a base, such as, base 30, 230, and the upper or second edge 467, would be used to secure to a cover, such as, cover 10, 210, 310. The window flap 427, has a first window flap 427A, and a second window flap 427B, which are either cut out of the wall or sleeve 461, or are secured thereto, and wherein the first window flap 427A, rotates about a hinge or fold line 426A, and a second window flap 427B, rotates about a hinge or fold line 426B. Additionally, the window or opening 425, has a first window portion 425A, and a second window portion 425B, which correspond to the area defined by the first window flap 427A, and the second window flap 427B, respectively. The wall or sleeve 461, has a first or inner surface 428, and a second or outer surface 429. It is preferred that the first window flap 427A, and the second window flap 427B, rotating about hinge or fold line 426A, 426B, respectively, open towards the inside surface 428, of the blind 423. But, for some applications the window flap 427A, and/or window flap 427B, could also be rotated and opened towards the outside surface 429, of the shelter 423. Thus under those circumstances the window flap 427A, could act as an awning or canopy 427A.

Figure 22:
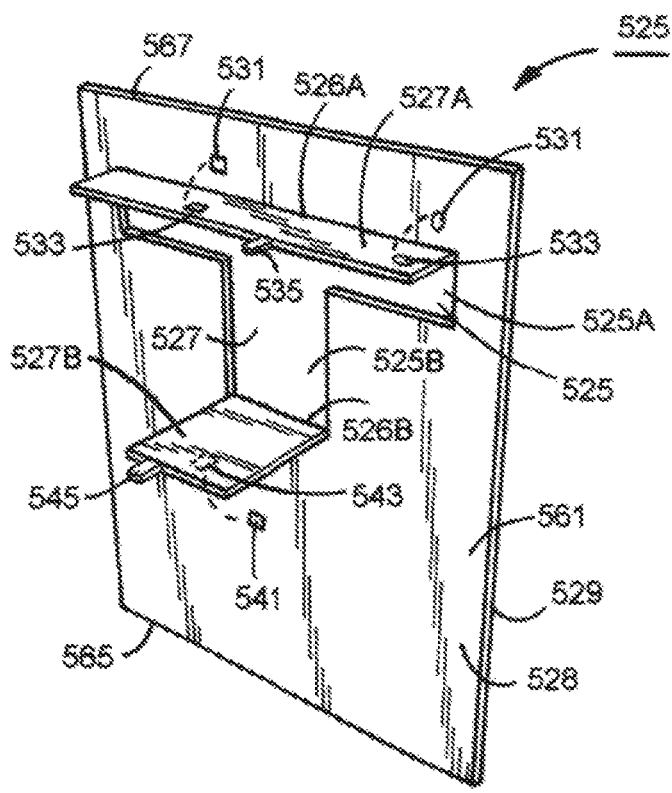
FIG. 22, illustrates a perspective view of another embodiment for a window flap for a wall or sleeve for a portable, collapsible, shelter of this invention.

FIG. 22, illustrates a perspective view of another embodiment for a an upper or first window flap 527A, and a lower or second window flap 527B, for a wall or sleeve 561, for a portable, collapsible, shelter 523, of this invention. The upper or first window flap 527A, and/or the lower or second window flap 527B, create an opening or window 525, in the inventive wall or panel or sleeve 561. The window or opening 525, has a first window portion 525A, and a second window portion 525B, which correspond to the area defined by the first window flap 527A, and the second window flap 527B, respectively. The wall or sleeve 561, has a first or inner surface 528, and a second or outer surface 529. It is preferred that the first window flap 527A, and the second window flap 527B, rotating about hinge or fold line 526A, 526B, respectively, open towards the inside surface 528, of the blind 523. But, for some applications the window flap 527A, and/or window flap 527B, could also be rotated and opened towards the outside surface 529, of the shelter 523. Thus under those circumstances the window flap 527A, could act as an awning or canopy 527A. The wall or panel 561, has a lower or first edge 565, and an upper or second edge 567. The lower or first edge 565, would be secured to a base, such as, base 30, 230, and the upper or second edge 567, would be used to secure to a cover, such as, cover 10, 210, 310. An inner or inside surface 528, of the wall or sleeve 561, could have an upper or first latching means 531, that would correspond to a second or upper window latching means 533, such that when latching means 531, 533, are brought in proximity to each other they would latch to each other, which would result in the upper window flap 527A, being latched onto and against the inside surface 528, of the wall or sleeve 561. For some applications the inside surface 528, of the wall or sleeve 561, could have an lower or third latching means 541, that would correspond to a fourth or lower window latching means 543, such that when latching means 541, 543, are brought in proximity to each other they would latch to each other, which would result in the lower window flap 527B, being latched onto and against the inside surface 528, of the wall or sleeve 561. For some applications the upper window or flap 527A, could have at least one tab or handle 535, for rotationally moving the window or flap 527A, around an edge or area or fold line 526A. Similarly, for some applications the lower window or flap 527B, could have at least one tab or handle 545, for rotationally moving the window or flap 527B, around an edge or area or fold line 526B.

Figure 23:
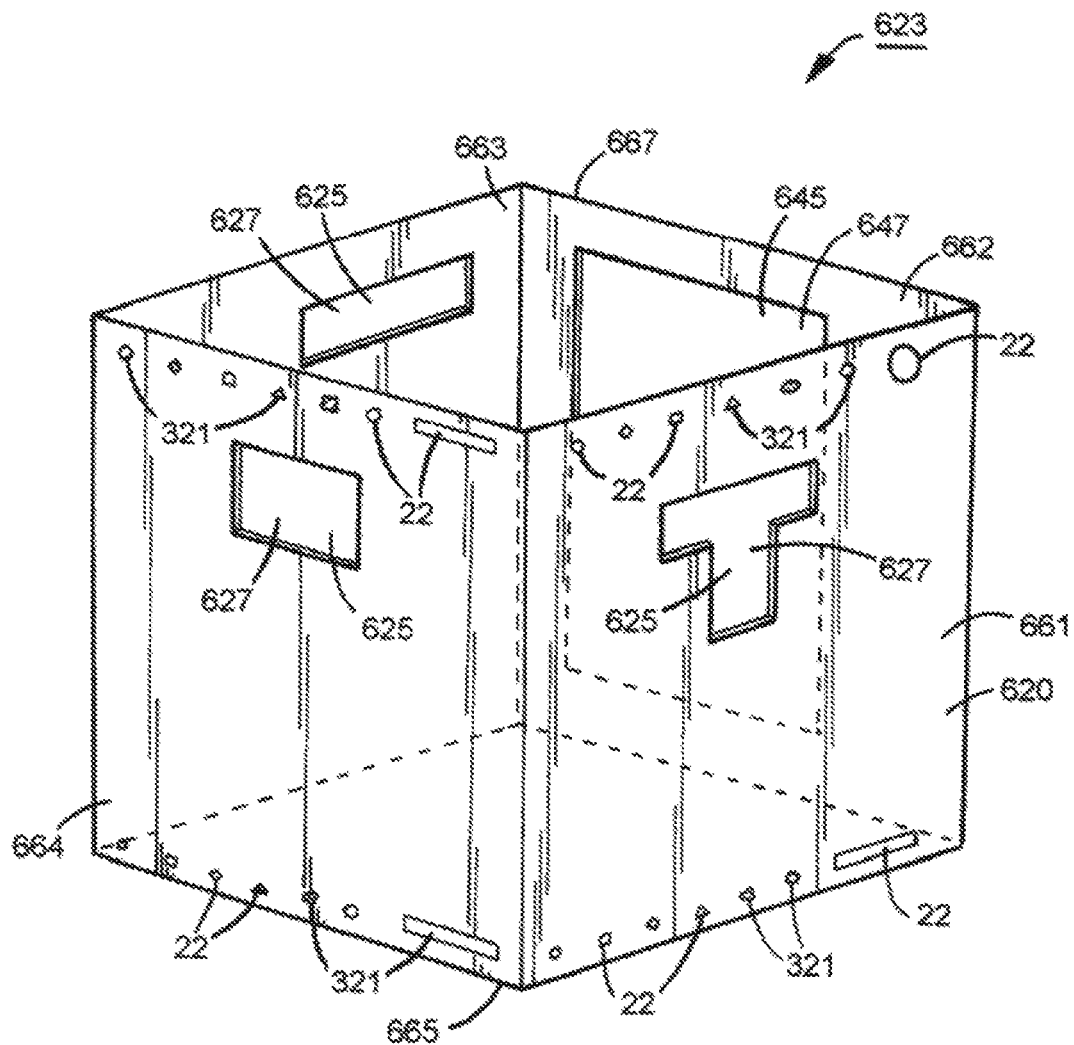
FIG. 23, illustrates a perspective view of another embodiment for a central housing sleeve for a portable, collapsible, shelter of this invention.

FIG. 23, illustrates a perspective view of a fifth embodiment for a central housing sleeve for a portable, collapsible, shelter 623, of this invention. The shelter 623, has a housing sleeve 620, which is formed by the joining or mating of side walls or sleeves 661, 662, 663, 664. The housing sleeve 620, has a lower wall edge 665, and an upper wall edge 667. The side walls or sleeves 661, 662, 663, 664, around the lower wall edge 665, could have at least one securing means 22, and/or at least one opening 321. Similarly, the side walls or sleeves 661, 662, 663, 664, around the upper wall edge 667, could have at least one securing means 22, and/or at least one opening 321. For some applications the side wall or sleeve 661, could have at least one window 627, and the side wall or sleeve 662, could have an opening 647, for a door 645, and the side wall or sleeve 663, could have an opening 625, for a window flap, such as, a window flap 427, 527, and the side wall or sleeve 664, could have an opening 625, for a window flap, such as, a window flap 427, 577.

Figure 24:
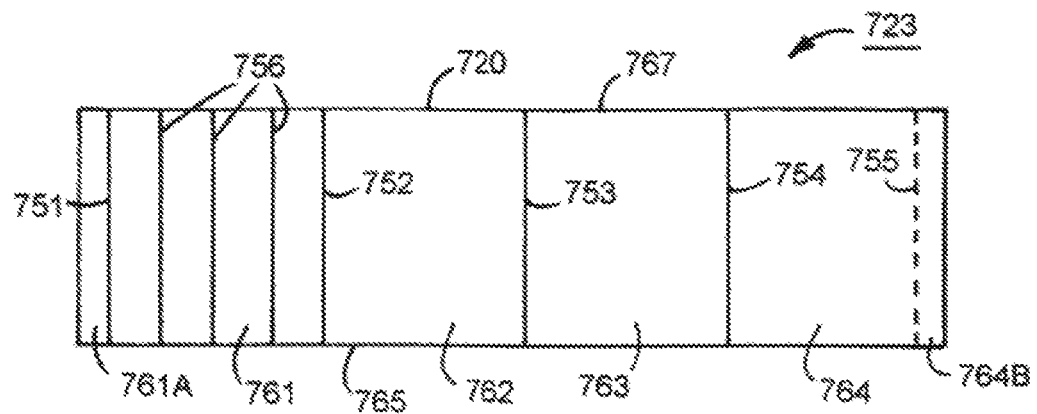
FIG. 24, illustrates a perspective view of a sixth embodiment for a central housing sleeve for a portable, collapsible, shelter of this invention.

FIG. 24, illustrates a perspective view of a sixth embodiment for a central housing sleeve for a portable, collapsible, shelter or blind or structure 723, of this invention. For the ease of understanding the cover, such as, cover 10, 110, 210, 310, or the base, such as base 30, 130, 230, 330, have not been shown, but would be associated with the shelter 723, once the shelter 723, has been fully assembled. The shelter 723, has a central housing sleeve 720, and where the central housing sleeve 720, has individual panels 761, 762, 763, 764, having fold lines and/or joints 751, 752, 753, 754, 755. The central housing sleeve 720, has been illustrated as being laid out flat on a surface. The individual panel, such as, an end panel 761, could have an edge tab or flap 76 IA, or an edge securing area 761A. Similarly, the individual panel, such as, an end panel 764, could have an edge tab or flap 764B, or an edge securing area 764B. For the purposes of illustration and ease of understanding other edge flaps or edge securing areas are not shown, but it is within the knowledge of a person skilled in the art to have edge flaps or edge securing areas, similar to the edge flap 761A, 764B, or an edge securing area 761A, 764B, for the other panels, such as, panel 761, 762, 763, and 764. The flattened structure 723, has a Lower edge 765, which would be used to mate with and accommodate a base, such as, base 30, and an upper edge 767, that would be used to mate with and accommodate a cover, such as, cover 10. For some applications the flattened housing sleeve 720, could have additional or secondary fold lines or joints 756, that would allow the sleeve 720, to be transported in a more compact manner, thus instead of say, 2 folds, if folded from the center, the sleeve 720, could have more than, say 6 folds.

Figure 25:
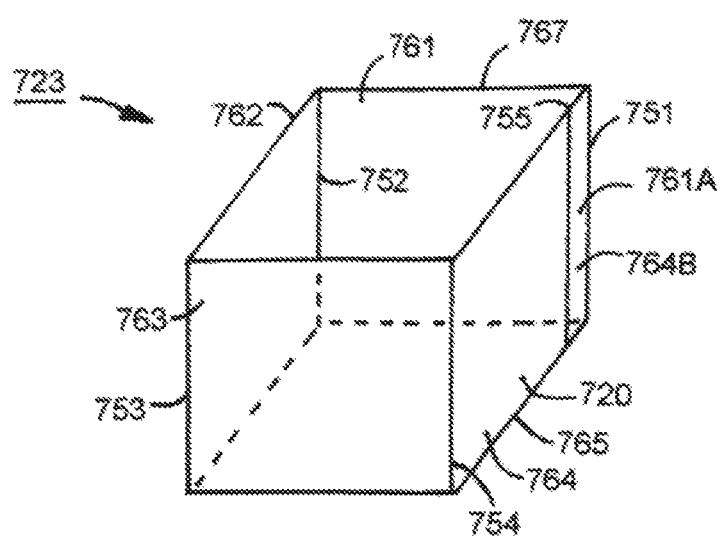
FIG. 25, illustrates a perspective view of a fully erect and assembled portable, collapsible, shelter of this invention.

FIG. 25, illustrates a perspective view of a fully erect and assembled portable, collapsible, shelter 723, of this invention, according to the sixth embodiment of FIG. 24. For the ease of understanding the cover, such as, cover 10, 110, 210, 310, or the base, such as, base 30, 130, 230, 330, have not been shown, but would be associated with the shelter 723, once the shelter 723, has been fully assembled. The panel 761, could have an area 761A, which could be an edge flap 761A, or it could be an area 761A, along the edge of the panel 761, similarly, the panel 764, could have an area 764B, which could be an edge flap 764B, or it could be an area 764B, along the edge of the panel 764, however, in order to secure one edge of a first panel to an edge of a second panel, one should have at least one edge flap 761A, and/or 764B, to secure the edge of the first panel to the edge of the second or end panel. The central housing sleeve 720, could be formed, for example, by folding panels 761, 762, 763, 764, along fold lines 752, 753, 754, and then folding end or edge panels 761A, and/or end or edge panel 764B, along fold line 751, 755, respectively, and then securing the end or edge panel 761A, and/or end or edge panel 764B, to an edge of the panel 761, or panel 764, using at least one securing means 725, in order to form the central housing sleeve 720, as shown in FIG. 25. The at least one securing means 725, could be selected from a group comprising, glue, adhesive, a hook and loop fastening means, rivet, screw, bolts secured to a nut, to name a few.

FIG. 26, illustrates a perspective view of a seventh embodiment for a central housing sleeve 820, for a portable, collapsible, shelter or a quick assembly hunting blind 823, of this invention. The polygonal housing sleeve or a flat housing panel 820, comprises of at least three wall panels, such as, for example, a first wall panel 822, having a first panel edge 822A, and an optional first mid-fold 822B, a second wall panel 824, having a panel edge 824A, or a corner fold 824A, and an optional second mid-fold 824B, a third wall panel 826, having a panel edge 826, or a corner fold 826A, and an optional third mid-fold 826B, a fourth wall panel 828, having a panel edge 828A, or a corner fold. 828A, an optional fourth mid-fold 828B, and an end panel or last panel edge 828C. For the ease of understanding four wall panels, namely, wall panels 822, 824, 826, and 828, have been shown in FIG. 26, however, one only needs a minimum of three wall panels to practice this invention, so as to, for example, form a triangular housing sleeve 820. Also, for some applications one could have more than four wall panels, such as, for example, a polygonal shape housing sleeve 820, such as, for example, a five side wall panels, so as to form a pentagonal housing sleeve 820, to name a few. The housing sleeve 820, has a top edge 67, and a bottom edge 65. The housing sleeve or the flat housing panel 820, could be transported as a single flat sleeve sheet 820, or it could be folded alongside corner folds 824A, 826A, and 828A, so as to make it more compact. To further reduce the transportation footprint of the polygonal housing sleeve 820, one could even fold along the optional mid-folds 822B, 824B, 826B, and 828B, which would essentially bring the footprint to half the size of the wall panels 822, 824, 826, and 828. The creases or the folds in the housing sleeve 820, can be made by methods well known in the art. For the ease of understanding the windows, doors, that would be present in the housing sleeve 820, are not being shown, but these windows and doors would be similar to the ones that have been illustrated and discussed earlier.

FIG. 27, illustrates a top view of the inventive cover panel 810, and an optional base panel 830, for the portable, collapsible, shelter or a quick assembly hunting blind 823, of this invention. The cover or top panel 810, comprises of a first cover flap 811, having a first cover flap edge 811A, and which can be folded along a first side fold or crease 810A, and a second cover flap 812, having a second cover flap edge 812A, and which can be folded along a second side fold or crease 810B. Optionally, one could also have a base or bottom panel 830, which comprises of a first base flap 831, having an first base flap edge 831A, and which can be folded along a first side fold or crease 830A, and a second base flap 832, having an second base flap edge 832A, and which can be folded along a second side fold or crease 830B. The cover panel 810, and the base panel 830, could be made separately, or made together having a separation or tear joint 835, which would allow the cover panel 810, and base panel 830, to be manufactured together but be separated from each other after the production, such as, in the field. The creases or the folds in the cover panel 810, and the optional base panel 830, can be made by methods well known in the art.

FIG. 28, illustrates a perspective view of an eighth embodiment for a central housing sleeve 825, for a portable, collapsible, shelter or a quick assembly hunting blind 823, of this invention. The eighth embodiment is basically a combination of the invention illustrated in FIG. 26, and FIG. 27, where the edge 828C, of the housing sleeve or a flat housing panel 820, has been combined or joined with the edge 812A, of the cover panel 810, and the edge 832A, of the optional base panel 830, so as to create a single production run for the sleeve panel 825, comprising the side panels 822, 824, 826, 828, the cover panel 810, and the optional base panel 830. The creases or the folds in the housing sleeve panel 825, the cover panel 810, and the optional base panel 830, can be made by methods well known in the art. For the ease of understanding the windows, and doors, that would be present in the housing sleeve 825, are not being shown, but these windows and doors would be similar to the ones that have been illustrated and discussed earlier.

FIG. 29, illustrates a perspective view of a fully erect and assembled tubular frame 855, for the portable, collapsible, shelter or a quick assembly hunting blind 823, of this invention. The tubular frame 855, comprises of a base or bottom tubular frame 860, a cover or top tubular frame 850, and a vertical or connecting tubular frame 840. The base tubular frame 860, is formed by joining individual tubular pieces 861, 862, 863, and 864, via at least one securing means 866, 867, 868, and 869. Similarly, the top tubular frame 850, is formed by joining, individual tubular pieces 851, 852, 853, and 854, via at least one securing means 856, 857, 858, and 859. Once the top tubular frame 850, and the bottom tubular frame 860, has been formed, one would then join the vertical tubular pieces 841, 842, 843, and 844, of the vertical tubular frame 840, to the corresponding edge or corner locations of the top tubular frame 850, and the bottom tubular frame 860, via the corresponding at least one securing means 856, 857, 858, 859, 866, 867, 868, and 869, resulting in a polygonal tubular structure or frame 855. It should be appreciated that the tubular pieces 841, 842, 843, 844, 851, 852, 853, 854, 861, 862, 863, and 864, are individual tubular pieces, and which can be transported as a bundle of tubular pieces, and then joined together in the field or location, as illustrated in FIG. 29, using at least one securing means 856, 857, 858, 859, 866, 867, 868, and 869, at locations where the three tubular ends of the tubular pieces meet, as clearly shown in FIG. 29.

FIG. 30, illustrates a perspective view of a fully erect and assembled portable, collapsible, shelter or a hunting blind or a hunting blind kit 823, of this invention. After the tubular pieces 841, 842, 843, 844, 851, 852, 853, 854, 861, 862, 863, and 864, have been securely joined to form the tubular frame or structure 855, one would then wrap the side walls 822, 824, 826, and 828, around the vertical tubular pieces 841, 842, 843, and 844, so as to form a housing sleeve 820/825, where the first panel edge 822A, is physically joined and mated with the last panel edge 828C. After the wrapping around of the housing sleeve 820/825, around the tubular frame 855, one would then secure the top or cover panel 810, over the tubular frame 855, such that, at least one securing means 845, secures the end flap 811, 812, to the corresponding side wall panel 822, 824, 826, 828, and/or the corresponding tubular frame 841, 842, 843, 844, so as to form the quick assembly hunting blind 823. For some applications one could also secure the optional base panel 830, to the tubular frame 855, which could be done by securing the base end flap 831, 832, of the base 830, to the corresponding side wall panel 822, 824, 826, 828, and/or the corresponding tubular frame 841, 842, 843, 844, using at least one securing means 865, so as to form the quick assembly hunting blind 823. It should be appreciated that the top end flaps 811, 812, of the cover 810, are on the outside of the side walls 822, 824, 826, 828, of the housing sleeve 820/825, while the base end flaps 831, 832, of the base 830, are secured to the inside of the side walls 822, 824, 826, 828, of the housing sleeve 820/825. For the ease of understanding, the windows, doors, that would be present in the housing sleeve 820/825, are not being shown, but these windows and doors would be similar to the ones that have been illustrated and discussed earlier.

It should be appreciated that the tubular members or pieces 841, 842, 843, 844, 851, 852, 853, 854, 861, 862, 863, and 864, are individual tubular pieces, and are typically assembled at the location of use, and are typically joined where the three tubular ends meet using at least one securing means 856, 857, 858, 859, 866, 867, 868, and 869, and wherein the at least one securing means 856, 857, 858, 859, 866, 867, 868, and 869, is selected from a group comprising a snap-on piece, a dove-tail type joint, a corner joint, a hook and loop means, a screw, a nail, a rivet, a clip-on means, a nut and bolt means, a glue, an adhesive, and combinations thereof, to name a few.

For some applications one could make this invention into a hunting blind kit 823. The hunting blind kit 823, could comprise of the tubular members 840, 850, 860, the housing sleeve 820 or 825, a cover panel 810, and the optional base panel 830. For the housing sleeve 820 or 825, the cover panel 810, and the optional base panel 830, one would use, for example, the coroplast type material but with one long sheet 820/825, such as, for example, a 5 feet by a 16 feet long sheet panel 820/825, and with appropriate openings for windows, and a door, for example, similar to the hunting blind structure 123, shown in FIG. 17. This new inventive hunting blind kit 823, could comprise, for example, one long piece 820/825, which could be folded, for example, every 2 feet to allow it to fold into, for example, a 60 inches by 24 inch foot print. This outside skin or folded coroplast sheet can then be unfolded and screwed or nailed to, for example, a wooden rectangle frame 855, that is, for example, 48 inches by 60 inches, so as to form the structure 823. One separate sheet of material 810, for example, 4 feet by 4 feet, could be used to cover the top of the structure by being nailed or screwed onto the top.

The material for the tubular members or pieces 841, 842, 843, 844, 851, 852, 853, 854, 861, 862, 863, and 864, could be selected from a group comprising a plastic material, a wood material, a metallic material, a composite material, and combinations thereof, to name a few.

The securing means 845, 865, could be selected from a group comprising a snap-on piece, a hook and loop means, a screw, a nail, a rivet, a glue, an adhesive, and combinations thereof, to name a few.

It should be appreciated that the central housing sleeve 20, 120, 220, 320, 720, 820, 825, could have individual side panels, such as, side panels 261, 262, 263, 264, 461, 561, that are secured by side edges to each other to form a housing sleeve 20, 120, 220, 320, 620, 720, 820, 825, or they could be formed as a central housing sleeve 20, 120, 620, 720, 820, 825.

For some applications one could also use a secondary or second securing means 163, such as, a stake 163, to mate with the flap 151, and to secure the structure 823, to the ground or structure 823, or to another structure, such as, for example, another portable structure 23, 123, 823, etc. For some applications one would need to add one or more stake down flap 151, on at least one side. The stake down flap 151, could be, welded 152, or glued 152, to the bottom surface or lower edge area 65, of the outside surface 29, of the housing sleeve 820/825. The stake down flap 151, could have a hole 153, so that one could drive a stake 163, through the hole 153, into the ground 120, and now the entire unit 823, would be staked down to the ground 120, on at least one side, and this would prevent the portable structure or hunting blind 823, from flying away under high wind conditions.

The inventive portable, collapsible, human shelter, 23, 123, 223, 323, 423, 523, 623, 723, 823, preferably, for outdoors, has been shown to have four sidewalls or side panels and an attachable and detachable roof or ceiling, however, for some applications one could also have an attachable and detachable floor or base, which is similar to the structure or panel used for the roof or ceiling. It is preferred that one of the side panel or side wall also functions has a door panel.

The inventive product 23, 123, 223, 323, 423, 523, 623, 723, 823, comes with, or without, a window 25, and/or window flap or window closure 27. For some embodiments the side panel of the inventive product could have at least one window or opening. The inventive product can stand alone, or it can be secured to any other structure. The inventive product can come in a variety of shapes, sizes, and colors.

The interior or exterior surface of the inventive product, is preferably, of such a nature, that it can be manufactured and used to display items, such as, for example, a logo, a pattern, a design, a camouflage, an outdoor scenery, to name a few.

It should be understood that the inventive structure can be used indoors and outdoors. Similarly, the inventive structure can also be used as a child's "Play House." Furthermore, in a play house version one could have removable decals or stickers 129, as shown in FIG. 17. It is preferred that the decals or stickers 129, stick to the inventive structure without any chemical adhesive, so that the decals or stickers 129, can be re-used. It should be understood that the decals or stickers 129, can be applied to the inside surface 28, 111, 131, or to the outside surface 29, 112, of the inventive structure. The stickers 129, can be selected from a group comprising, letters of the alphabet, a "Space Ship Kit", a spaceship control panel, a window showing a star/moon image, a "Medieval Castle Kit", a decal of a suit of armor/swords, a window showing knights jousting, a little girls "Kit" with pretty pink flowers and furniture or house wares, to name a few.

The panels, ceiling, roof, walls, base, for the portable, collapsible apparatus 23, 123, 223, 323, 423, 523, 623, 723, 823, could be made of at least one layer of material, and wherein the at least one material could be selected from a group comprising of a corrugated material, a plastic material, a composite material, a waterproof material, a weatherproof material, a Coroplast material, a foil-type material, a paper material, a plastic-type material, a cardboard material, a vinyl material, an extruded corrugated plastic material, polyethylene material, polypropylene material, and combinations thereof, to name a Coroplast is a Trademark of Coroplast Inc. Instead of a Coroplast material one can use a lightweight rigid honeycomb type board or material.

For some applications the walls or the panels or the roof or the base of the inventive product 23, 123, 223, 323, 423, 523, 623, 723, 823, could be made of a first material and a second material, and wherein the first material, for example, could be a corrugated material, a plastic material, a composite material, a waterproof material, a weatherproof material, a Coroplast material, a lightweight rigid honeycomb type board or material, a foil-type material, a paper material, a plastic-type material, a cardboard material, a vinyl material, an extruded corrugated plastic material, polyethylene material, polypropylene material, and combinations thereof, to name a few, and the second material could be, for example, a corrugated material, a plastic material, a composite material, a waterproof material, a weatherproof material, a Coroplast material, a lightweight rigid honeycomb type board or material, a foil-type material, a paper material, a plastic-type material, a cardboard material, a vinyl material, an extruded corrugated plastic material, polyethylene material, polypropylene material, and combinations thereof, to name a few.

it is preferred that the material used for the inventive portable, collapsible, human shelter, 23, 123, 223, 323, 423, 523, 623, 723, 823, are weather resistant, and are capable of being used for outdoor purposes.

For some applications the exterior surface of the inventive portable, collapsible, human shelter, 23, 123, 223, 323, 423, 523, 623, 723, 823, could be painted with or lined with material 775, such as, with a material that protects the inventive product from UV (ultraviolet) radiation or light. The painted or liner material 775, could also act as a potential UV protective material or layer. For durability one could spray or roll-on the layer or the covering material. However, for some applications one could also use "rubberized paint product" 775, which could be sprayed-on or rolled-on, or could be applied as a coating by methods well known in the art.

The inventive portable, collapsible, human shelter, 23, 123, 223, 323, 423, 523, 623, 723, 823, is provided with at least one door, which door could be die cut into the panel, or it could be attached to an opening in the panel with at least one securing means, and wherein the securing means could, for example, be a hinge. It is preferred that the securing means allows for the quiet movement of the door by the user during use. For some applications, one or more edge of the door could be provided with at least one flange, so as to allow the door to be opened or closed from the inside of the inventive improved, portable, collapsible, human shelter.

For some applications the door could be provided with at least one window, which window could be die cut into the panel or door, or it could be attached to an opening in the door with at least one securing means, and wherein the securing means could, for example, be a hinge. It is preferred that the securing means allows for the quiet movement of the window by the user from the inside of the inventive structure. For some applications, one or more edge of the window could be provided with at least one flange, so as to allow the window to be opened or closed from the inside of the inventive improved, portable, collapsible, human shelter.

It should be appreciated that preferably at least one wall panel of the inventive shelter has at least one window. For the ease of understanding the cross-sectional shape of the window(s) or door(s) for the inventive portable, collapsible, human shelter, 23, 123, 223, 323, 423, 523, 623, 723, 823, have been shown as being a square shape, or a rectangular shape, or a polygonal shape, or a T-shape, but it is within the realm of a person skilled in the art to have the cross-sectional shape for the window(s) or door(s) of the inventive shelter be selected from a group comprising a triangular-shape, a square-shape, a rectangular-shape, a circular-shape, an oval-shape, a multisided-shape, a polygonal-shape, a T-type shape, an odd-shape, an irregular-shape, and combinations thereof, to name a few.

For some applications at least one side panel of the inventive portable, collapsible, human shelter, 23, 123, 223, 323, 423, 523, 623, 723, 823, could be provided with at least one window, which window could be die cut into the side panel or it could be attached to an opening in the side panel with at least one securing means, and wherein the securing means could, for example, be a hinge. It is preferred that the securing means allows for the quiet movement of the window by the user from the inside of the inventive structure. For some applications, one or more edge of the window could be provided with at least one flange, so as to allow the window to be opened or closed from the inside of the inventive improved, portable, collapsible, human shelter.

For some applications the three side panels and the front door panel and the roof could be all individual panels, and which when assembled, could form the inventive portable, collapsible, human shelter 23, 123, 223, 323, 423, 523, 623, 723, 823. However, for some applications one or more of the panels could be formed as one unit, such as, for example, the roof could be formed with one of the side panel or the door panel, or two of the side panels could be formed as one unit, or the door panel and one of the adjacent side panel could be formed as one unit.

For some applications each of the panels, such as, the sides, the top, the bottom, could be made from a larger panel and which could be die cut for a specific shape, or they could be individually made, such as, for a custom application.

For some applications the sleeve is made from four panels, such that the edges of each of the panels are secured to each other by means well known in the art, so as to form the inventive sleeve. However, for some applications one could have a long panel where the panel could be folded so as to form side walls, and the two opposite edges could be secured to each other so as to form the inventive sleeve for the portable, collapsible, human shelter.

It should be appreciated that the cross-sectional shape of the inventive portable shelter, such as, for example, the cover, the base, the housing sleeve, could be selected from a group comprising a triangular-shape, a square-shape, a rectangular-shape, a circular-shape, an oval-shape, a multi-sided-shape, a polygonal-shape, an odd-shape, an irregular-shape, and combinations thereof, to name a few.

It should also be appreciated that the cross-sectional shape of the at least one securing means for securing various items to form the inventive portable, collapsible, human shelter, 23, 123, 223, 323, 423, 523, 623, 723, 823, could be selected from a group comprising a triangular-shape, a square-shape, a rectangular-shape, a circular-shape, an oval-shape, a multisided-shape, a polygonal-shape, an odd-shape, an irregular-shape, and combinations thereof, to name a few.

For some applications the roof 10, could be made from a panel where at least one of the edge is folded and secured to the inside edge of the roof so as to form a box like structure having a lip or a roof extension. The lip or the roof extension could have at least one securing means, such as, a hook and loop type securing means, an adhesive-type tape, to name a few. It is preferred that the securing means are adhered to the inside surface of the lip or roof extension, so that once secured to one edge of the sleeve, the sleeve fits snugly inside the roof portion with the lip or roof extension extending along a portion of the outer edges of the sleeve.

For some applications the base or floor 30, could be made from a panel where at least one of the edge is folded and secured to the inside edge of the base or floor 30, so as to form a box like structure having a lip or a base or floor extension. The lip or the base or floor extension could have at least one securing means, such as, a hook and loop type securing means, an adhesive-type tape, to name a few. It is preferred that the securing means are adhered to the outside surface of the lip or base or floor extension, so that once secured to one edge of the sleeve, the sleeve fits snugly to the outside edges of the base or floor portion with the lip or base or floor extension extending along a portion of the inner edges of the sleeve.

For some applications the once formed sleeve for the portable, collapsible, human shelter. 23, 123, 223, 323, 423, 523, 623, 723, 823, could have two folds on two opposite panels, so that the sleeve could collapse, like an accordion onto itself, for easy storage or transportation. It should also be understood that the inventive sleeve, or the cover, or the base, could have one or more folding lines or folds, which would make it easy for transportation and/or storage. For example if the footprint is 4'×5', with only one additional fold it would be reduced to a 2'×5' footprint.

It is preferred that the outer peripheral edges of the base or floor panel snugly fits inside the inner lower peripheral wall edges of the sleeve. This configuration will keep water from being able to go inside the base or floor panel or unit, and will also help push the walls of the sleeve out and stabilize the four walls of the sleeve. For most applications the peripheral edges of the top cover or roof panel will remain on the outside of the peripheral edges of the central housing sleeve as discussed earlier.

It is preferred that a band of a securing means, such as, a Velcro strip, or a double-sided-adhesive tape, to name a few, are secured around the inner or outer peripheral edges of the panel or sleeve portion that is being secured to each other, so that each of the components are properly and appropriately secured to each other. For some applications one could use high strength magnets, such as, Neodymium Magnets, or magnetic tape, etc., instead of a Velcro, as a securing means.

It should be appreciated that the base and/or the cover of the portable, collapsible, human shelter could be secured to the housing sleeve by a number of methods and/or securing means. For some applications the at least one securing means could be selected from a group comprising a hook and loop means, a Velcro strip, a double-sided-adhesive tape, a high strength magnet, a neodymium magnet, a magnetic tape, a belt, a rivet, a clip, a screw, a bolt, a glue, an adhesive, and combinations thereof, to name a few.

For some applications the sleeve could be made from a single sheet or panel, and then secured at the edges of the two longitudinal ends. Prior to the securing of the two ends it is preferred that the sleeve has at least three creases or predefined edges for the four panels. It is also preferred that the sleeve also has at least two center creases for folding or laying the sleeve flat during shipment, similar to an accordion type fold.

For some applications, the central housing sleeve 20, could be, for example, two 96 inches in length by 60 inches in height flat sheets, which could be secured at the edges, such as, for example, heat welded together. It should be understood that the dimensions of the sizes of the cover, base, housing sleeve, would depend on the need of the customer or user.

It is preferred that all the windows and doors fold inward, and that the windows and doors have at least one flange attached on the inside surface to allow the occupant to push them shut, but not be able to push them through the central housing sleeve 20.

It should be understood that for some application the inner surface or the outer surface of the inventive portable, collapsible, human shelter, 23, 123, 223, 323, 423, 523, 623, 723, 823, could be painted 775, such as, with an appropriate paint 775, or an exterior surface material 775.

For some applications one could use a UV stable weatherable film which could be applied or printed onto one or more of the panels, such as, in a camo design, or as a wrap, or a cover over the material, such as, the plastic material, this is akin to a situation where one would have two different materials for one or more of the panels.

For some applications the sleeve and the upper and lower panels of the inventive portable, collapsible, human shelter, 23, 123, 223, 323, 423, 523, 623, 723, 823, could be fluted corrugated wall material, such as, for example, a polyethylene, a polypropylene, to name a few, and which can be made from either prime virgin plastic material, or recycled material.

It should be understood that the inventive portable, collapsible, human shelter, 23, 123, 223, 323, 423, 523, 623, 723, 823, could multiple sizes, depending on the application or the user's requirements.

For the ease of understanding the cross-sectional shape of the inventive portable, collapsible, human shelter, 23, 123, 223, 323, 423, 523, 623, 723, 823, have been shown as having four panels or walls or sidewall, but it is within the realm of a person skilled in the art to have the inventive shelter having one round or oval wall or having a triangular wall or polygonal shaped walls, etc. However, for most applications it is preferred that the cross-sectional shape of the inventive portable, collapsible, human shelter, 23, 123, 223, 323, 423, 523, 623, 723, 823, be selected from a group comprising a triangular-shape, a square-shape, a rectangular-shape, a circular-shape, an oval-shape, a multisided-shape, a polygonal-shape, an odd-shape, an irregular-shape, to name a few.

It should also be appreciated that the interior surface or the exterior surface or both surfaces of the wall or panel or roof or ceiling or base of the inventive structure could have at least one inscription 750, and wherein the inscription 750, could be selected from a group comprising of a design, an indicia, a drawing, a photograph, a scenery, a picture, an illustration, a gesture, a smiley-type face, a phrase, a statement, a rhyme, an alphabet, a numeral, a symbol, a visual message, a graphic image, a verbiage, a camouflage, an outdoor scenery, just to name a few.

Edges of each of the panels that are used to assemble or form the inventive portable, collapsible, human shelter, 23, 123, 223, 323, 423, 523, 623, 723, 823, could have at least one securing means to secure each edge to the other, so as to form a sturdy structure, when assembled. And, wherein the at least one securing means could be selected from a group comprising a tie, a cable tie, a pin, a push pin, a clip, a clamp, hook and loop means, a weld, to name a few.

For some applications one could also use a 90 degree corner profile that slides onto the edge of the two sheets of material or the two panels, effectively creating a corner and joining the two sheets or panels. It should be understood that the joining of the corner sections of the boards and panels is well known in the art, such as, for example, TPextrusions.com teach that they stock and manufacture a wide variety of corner profiles for use on boards, panels, glass, plywood, and other common materials. Although the majority of these corner joints are 90 degree, they can also make to different angles should this be required. They also disclose that the corner strips complement the other board and panel profiles for all exhibition building, shop-fitting and general furniture and building purposes. They also provide H-Sections, T-Sections, capping and clip-on edging which can be found on their board and panel landing page at www.tpextrusions.com. Their 90 degree corner profiles are available in popular sizes and styles, and a range of colors. These include the rounded corner section, which have a sufficient flex in it to open or close the angle from 90 degrees.

It should be appreciated that the "collapsible box design" of the inventive portable, collapsible, human shelter, 23, 123, 223, 323, 423, 523, 623, 723, 823, or the inventive blind, 23, 123, 213, 323, 423, 523, 623, 723, 823, is very light-weight, inexpensive, weatherable material, as it uses material, such as, a Coroplast-type material, and the "collapsible box design" gives the user the ease of assembling it, and the manufacturer or the user to flat shipping it.

As stated earlier that the inventive portable, collapsible, human shelter, 23, 123, 223, 323, 423, 523, 623, 723, 823, or the inventive blind, 23, 123, 223, 323, 423, 523, 623, 723, 823, uses material, such as, a Coroplast-type material, which has insulating capabilities. This insulating capabilities are further enhanced by the fluted design of the sheet or panel, which leaves a layer of air between the two sheet walls, which sandwich the fluted material.

It should be appreciated that both the top cover or roof panel, and the bottom or base panel, can go either inside or outside of the sleeve panel. If they are inserted inside the sleeve panel then they would provide more stability, and if they are placed outside of the sleeve panel then they would provide more water resistance, and each of the configurations or assembly would depend on what the customer or the user may want.

It should be appreciated that the material for each of the panel can come in different range of thicknesses and strength, depending on the customer or users price point or end application, for example, thicker panels could be used for heavier duty use, while thinner panels could be for a less expensive application, or where a heavy duty blind is not needed.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of forming a portable, collapsible, housing structure, comprising the steps of:
   (a) forming a plurality of tubular members into a tubular frame, wherein said tubular frame comprises a base tubular frame, a top tubular frame, and wherein said base tubular frame is directly connected to said top tubular frame via a plurality of connecting tubular members;
   (b) forming a flat housing panel having a top edge and a bottom edge, said flat housing panel further comprising a first side panel, a second side panel, and at least one third side panel, and wherein the joining of said first side panel to said second side panel and said at least one third side panel forms a housing sleeve;
   (c) forming a cover panel having a first cover sidewall and at least one second cover sidewall;
   (d) wrapping said flat housing panel around said tubular frame, such that said bottom edge of said flat housing panel is secured to said base tubular frame, and said top edge of said flat housing panel is secured to said top tubular frame, and securing said cover panel to the outside of said tubular frame such that said first cover sidewall is secured to said first side panel of said flat housing panel, and securing said at least one second cover sidewall to one of said second side panel and said at least one third side panel of said flat housing panel;
   (e) forming at least one door in said housing sleeve for an entry and exit by at least one human; and
   (f) wherein the method further comprises a step of taking a base panel having a first base sidewall, and at least one second base sidewall, and securing said base panel to the inside of said tubular frame such that said first base sidewall is secured to said first side panel of said flat housing panel along a portion of said bottom edge, and said at least one second base sidewall is secured to one of said second side panel and said at least one third side panel of said flat housing panel along a portion of said bottom edge.

2. The method of forming a portable, collapsible, housing structure of claim 1, wherein at least a portion of said first cover sidewall is secured to one of said top tubular members of said tubular frame, and at least a portion of said at least one second cover sidewall is secured to one of said top tubular member of said tubular frame.

3. The method of forming a portable, collapsible, housing structure of claim 1, wherein said first cover sidewall, and said at least one second cover sidewall are secured to said side panels of said flat housing panel using at least one cover securing means, and wherein said at least one cover securing means is selected from a group consisting of a hook and loop means, a double-sided-adhesive tape, a magnet, a neodymium magnet, a magnetic tape, a belt, a rivet, a clip, a screw, a bolt, a glue, an adhesive, and combinations thereof.

4. The method of forming a portable, collapsible, housing structure of claim 1, wherein at least a portion of said first base sidewall is secured to one of said base tubular members of said tubular frame, and at least a portion of said at least one second bottom sidewall is secured to one of said base tubular member of said tubular frame.

5. The method of forming a portable, collapsible, housing structure of claim 1, wherein said first base sidewall, and said at least one second base sidewall are secured to said side panels of said flat housing panel using at least one base securing means, and wherein said at least one base securing means is selected from a group consisting of a hook and loop means, a double-sided-adhesive tape, a magnet, a neodymium magnet, a magnetic tape, a belt, a rivet, a clip, a screw, a bolt, a glue, an adhesive, and combinations thereof.

6. The method of forming a portable, collapsible, housing structure of claim 1, wherein said plurality of tubular members further comprise of at least one first tubular member, and at least one second tubular member, and wherein an end of said at least one first tubular member is secured to an end of said at least one second tubular member using at least one tubular member securing means, and wherein said at least one tubular member securing means is selected from a group consisting of a snap-on piece, a dove-tail type joint, a corner joint, a hook and loop means, a screw, a nail, a rivet, a clip-on means, a nut and bolt means, a glue, an adhesive, and combinations thereof.

7. The method of forming a portable, collapsible, housing structure of claim 1, wherein material for said tubular members is selected from a group consisting of a plastic material, a wood material, a metallic material, a composite material, and combinations thereof.

8. The method of forming a portable, collapsible, housing structure of claim 1, wherein the method further comprises forming at least one window in at least one side panel of said portable, collapsible, housing structure, and wherein the cross-sectional shape of said at least one window is selected from a group consisting of a triangular-shape, a square-shape, a rectangular-shape, a circular-shape, an oval-shape, a multisided-shape, a polygonal-shape, a T-type shape, an irregular-shape, and combinations thereof.

9. The method of forming a portable, collapsible, housing structure of claim 1, wherein the method further comprises forming at least one window in said at least one wall panel of said portable, collapsible, housing structure, and further forming at least one window flap to open and close said at least one window.

10. The method of forming a portable, collapsible, housing structure of claim 1, wherein the method anther comprises forming at least one window in at least one side panel of said portable, collapsible, housing structure, and further forming at least one window flap to open and close said at least one window, and securing at least one latch to said at least one window flap.

11. The method of forming a portable, collapsible housing structure of claim 1, wherein the method further comprises forming said tubular frame into a cross-sectional shape selected from a group consisting of a triangular shape, a square-shape, a rectangular-shape, a multisided-shape, a polygonal-shape, an irregular-shape, and combinations thereof.

12. The method of forming a portable, collapsible, housing structure of claim 1, wherein the method further comprises forming at least one inscription on one of an internal surface and an external surface of said portable, collapsible, housing structure, and wherein said at least one inscription is selected from a group consisting of a design, an indicia, a drawing, a photograph, a scenery, a picture, an illustration, a gesture, a smiley-type face, a phrase, a statement, a rhyme, an alphabet, a numeral, a symbol, a visual message, a graphic image, a verbiage, a camouflage, an outdoor scenery, and combinations thereof.

13. The method of forming a portable, collapsible, housing structure of claim 1, wherein said flat housing panel and said cover panel are made from at least one material selected from a group consisting of a corrugated material, a plastic material, a composite material, a waterproof material, a weatherproof material, a honeycomb material, a foil-type material, a paper material, a plastic-type material, a cardboard material, a vinyl material, an extruded corrugated plastic material, polyethylene material, polypropylene material, and combinations thereof.

14. The method of forming a portable, collapsible, housing structure of claim 1, wherein the method anther comprises coating said portable, collapsible, housing structure with at least one layer of at least one material.

15. The method of forming a portable, collapsible, housing structure of claim 1, wherein the method further comprises coating said portable, collapsible, housing structure with at least one layer of at least one material, and wherein said at least one material is selected from a group consisting of an UV (ultraviolet) radiation protective material, a paint material, a liner material, a rubberized paint product, and combinations thereof.

16. The method of forming a portable, collapsible, housing structure of claim 1, wherein the method further comprises securing a first end of at least one anchoring device to said portable, collapsible, housing structure, and securing a second end of said at least one anchoring device to at least one anchor-able structure.

17. The method of forming a portable, collapsible, housing structure of claim 1, wherein the method further comprises securing at least one stake down flap to a bottom portion of said portable, collapsible, housing structure, and passing at least one anchoring device through said at least one stake down flap to secure said portable, collapsible, housing structure to at least one anchor-able structure.

18. A method of forming a portable, collapsible, housing structure, comprising, the steps of:
  (a) forming a plurality of tubular members into a tubular frame, wherein said tubular frame comprises a base tubular frame, a top tubular frame, and wherein said base tubular frame is directly connected to said top tubular frame via a plurality of connecting tubular members;
  (b) using a panel sheet, and forming a flat housing panel, a cover panel, and a base panel, and tearing said cover panel, and said base panel, along a tear joint, and separating said cover panel, and said base panel, from said panel sheet;
  (c) forming said flat housing panel having a top edge and a bottom edge, said flat housing panel further comprising a first side panel, a second side panel, and at least one third side panel, and wherein the joining of said first side panel to said second side panel and said at least one third side panel forms a housing sleeve;
  (d) forming said cover panel having a first cover sidewall and at least one second cover sidewall;
  (e) wrapping said flat housing panel around said tubular frame, such that said bottom edge of said flat housing panel is secured to said base tubular frame, and said top edge of said flat housing panel is secured to said top tubular frame, and securing said cover panel to the outside of said tubular frame such that said first cover sidewall is secured to said first side panel of said flat housing panel, and said at least one second cover sidewall is secured to one of said second side panel and said at least one third side panel of said flat housing panel;
  (f) forming said base panel having a first base sidewall, and at least one second base sidewall, and securing said base panel to the inside of said tubular frame such that said first base sidewall is secured to the inside wall of said first side panel of said flat housing panel along a portion of said bottom edge, and securing said at least one second base sidewall to the inside wall of one of said second side panel and said at least one third side panel of said flat housing panel along a portion of said bottom edge; and
  (g) forming at least one door in said housing sleeve for an entry and exit by at least one human, and thereby forming said portable, collapsible, housing structure.

19. The method of forming a portable, collapsible, housing structure of claim 18, wherein the method further comprises forming at least one window in at least one side panel of said portable, collapsible, housing structure, and further forming at least one window flap to open and close said at least one window.

20. The method of forming a portable, collapsible, housing structure of claim 18, wherein said panel sheet is made from at least one material selected from a group consisting of a corrugated material, a plastic material, a composite material, a waterproof material, a weatherproof material, a honeycomb material, a foil-type material, a paper material, a plastic-type material, a cardboard material, a vinyl material, an extruded corrugated plastic material, polyethylene material, polypropylene material, and combinations thereof.

* * * * *